US008970903B2

(12) United States Patent
Matsunaga

(10) Patent No.: US 8,970,903 B2
(45) Date of Patent: Mar. 3, 2015

(54) DEVICES AND METHODS FOR PRINTING BACKGROUND IMAGES

(75) Inventor: Hirotaka Matsunaga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 509 days.

(21) Appl. No.: 13/356,837

(22) Filed: Jan. 24, 2012

(65) Prior Publication Data

US 2012/0188568 A1 Jul. 26, 2012

(30) Foreign Application Priority Data

Jan. 24, 2011 (JP) ................................ 2011-012092

(51) Int. Cl.
*H04N 1/60* (2006.01)
*B41J 2/21* (2006.01)

(52) U.S. Cl.
CPC .................................... *B41J 2/2117* (2013.01)
USPC ........... 358/1.9; 358/3.28; 358/450; 358/540; 347/9; 347/10; 347/14; 347/15; 347/104

(58) Field of Classification Search
None
See application file for complete search history.

(56) References Cited

U.S. PATENT DOCUMENTS 5,992,972 A 11/1999 Nagoshi et al.
7,237,861 B2 * 7/2007 Suzuki et al. .................. 347/15
7,407,277 B2 8/2008 Yoneyama
8,480,195 B2 * 7/2013 Fujisawa et al. .................. 347/9
8,506,034 B2 * 8/2013 Usuda et al. .................... 347/14
2005/0200679 A1 * 9/2005 Falser et al. ................... 347/104
2006/0158494 A1 * 7/2006 Yamanobe ...................... 347/96
2006/0188295 A1 * 8/2006 Kasiske et al. ................ 399/182
2008/0211866 A1 * 9/2008 Hill ................................ 347/42
2009/0033956 A1 * 2/2009 Tamagawa ..................... 358/1.9
2009/0244568 A1 * 10/2009 Watanabe ...................... 358/1.9
2010/0259770 A1 10/2010 Usuda et al.
2011/0018921 A1 * 1/2011 Fujisawa et al. ................ 347/10

FOREIGN PATENT DOCUMENTS

JP 2008-200853 A 9/2008
JP 2009-113284 A 5/2009
JP 2010-221499 A 10/2010

* cited by examiner

*Primary Examiner* — Dung Tran
(74) *Attorney, Agent, or Firm* — Nutter McClennen & Fish LLP

(57) ABSTRACT

Disclosed is a printing apparatus that forms a color image and a background image on a medium by repeating a dot formation operation of causing ink to be discharged from a first nozzle array and a second nozzle array moving in a moving direction so as to form the color dot and the background dot on the medium and a transport operation of transporting the medium in a transport direction, wherein a pixel in which the background dot is formed on the color dot and a pixel in which the color dot is formed on the background dot are mixed so as to form an area where the color image and the background image overlap.

5 Claims, 19 Drawing Sheets

THIS EMBODIMENT

FRONT SURFACE PRINTING IMAGE

--PRIOR ART –

BACK SURFACE PRINTING IMAGE

--PRIOR ART –

THIS EMBODIMENT

FIRST EMBODIMENT

SECOND EMBODIMENT (THIRD EMBODIMENT)

DEVICES AND METHODS FOR PRINTING BACKGROUND IMAGES

Priority is claimed under 35 U.S.C. §119 to Japanese Application No. 2011-012092 filed on Jan. 24, 2011 which are here by incorporated by reference in its entirety.

BACKGROUND

1. Technical Field

The present invention relates to a printing apparatus and a printing method.

2. Related Art

A printing technique in which a background image with a background color, such as white, and a color image are printed on a transparent medium is known (refer to JP-A-2009-113284). In cases where a color image is to be viewed from the printing surface side of a medium, a background image is first printed on the medium and then a color image is printed on the background image. This printing method is referred to as "front surface printing". In contrast, in cases where a color image is to be viewed from the back side of a transparent medium, a color image is first printed on the medium and then a background image is printed on the color image. This printing method is referred to as "back surface printing".

In the case where front surface printing has been carried out, when viewed from the front side of the medium, because a color image has been printed on the background image, it is easy to see the color image. When viewed from the back side of the medium, however, the color image is hard to see because it is hidden under the background image.

On the other hand, in the case where back surface printing has been carried out, when viewed from the back side of a medium, because a color image has been printed on the background image, it is easy to see the color image. When viewed from the front side of the medium, however, the color image is hard to see because the color image is hidden under the background image.

SUMMARY

An advantage of some aspects of the invention is that it makes a color image easy to see from both sides when printed on a background image.

A printing apparatus includes a transport unit configured to transport a transparent medium in a transport direction, a first nozzle array having a plurality of nozzles arranged in the transport direction, the plurality of nozzles being configured to discharge ink for forming a color image to form a color dot on the medium, a second nozzle array having a plurality of nozzles arranged in the transport direction, the plurality of nozzles being configured to discharge ink for forming a background image to form a background dot on the medium, and a carriage configured to cause the first nozzle array and the second nozzle array to move along a moving direction intersecting the transport direction. The color image and the background image are formed on the medium by repeating a dot formation operation of causing the ink to be discharged from the first nozzle array and the second nozzle array moving in the moving direction to form the color dot and the background dot on the medium and a transport operation of transporting the medium in the transport direction. A pixel in which the background dot is formed on the color dot and a pixel in which the color dot is formed on the background dot are mixed so as to form an area where the color image and the background image overlap.

With such a printing apparatus, it is possible to make a color image easy to see from both sides while printing a background image.

It is preferable that by causing, during the dot formation operation, positions in the transport direction of the nozzles discharging the ink of the first nozzle array to overlap positions in the transport direction of the nozzles discharging the ink of the second nozzle array, and by repeatedly performing the dot formation operation in which the first nozzle array and the second nozzle array move forward in the moving direction and the dot formation operation in which the first nozzle array and the second nozzle array move backward in the moving direction, the pixel in which the background dot is formed on the color dot and the pixel in which the color dot is formed on the background dot are mixed in the area where the color image and the background image overlap.

Thus, it is possible to make a color image easy to see from both sides.

It is preferable that the plurality of nozzles of the first nozzle array and the plurality of nozzles of the second nozzle array be arranged, in each nozzle array, at a predetermined interval along the transport direction, a plurality of dot rows be formed along the transport direction at an interval shorter than the predetermined interval by repeating the dot formation operation and the transport operation, and, of the dot rows, first ones in which the background dot is formed on the color dot and second ones in which the color dot is formed on the background dot be alternately formed in the area where the color image and the background image overlap.

Thus, a color image that is approximately the same as image data can be visually recognized.

It is preferable that, between the color dot and the background dot formed so as to be spaced in the dot formation operation in which the first nozzle array and the second nozzle array move outward in the moving direction, the color dot and the background dot formed in the dot formation operation in which the first nozzle array and the second nozzle array move backward in the moving direction be positioned.

Thus, lines along the moving direction are less likely to be visually recognized.

It is preferable that correction processing of increasing a density of data representing the color image be performed, and the color image be formed on the medium in accordance with the data after the correction processing.

Thus, a color image printed on a medium can be inhibited from appearing light.

It is preferable that a generation rate of the color dot constituting the color image after the correction processing be less than two times that in a case where the correction processing is not performed.

Thus, the density of a color image can be corrected to an appropriate density.

A printing method uses a printing apparatus including a transport unit configured to transport a transparent medium in a transport direction, a first nozzle array having a plurality of nozzles arranged in the transport direction, the plurality of nozzles being configured to discharge ink for forming a color image to form a color dot on the medium, a second nozzle array having a plurality of nozzles arranged in the transport direction, the plurality of nozzles being configured to discharge ink for forming a background image to form a background dot on the medium, and a carriage configured to cause the first nozzle array and the second nozzle array to move along a moving direction intersecting the transport direction. The printing method includes forming the color image and the background image on the medium by repeating a dot formation operation of causing the ink to be discharged from the first nozzle array and the second nozzle array moving in the moving direction to form the color dot and the background dot on the medium and a transport operation of transporting the medium in the transport direction. In the printing method, a pixel in which the background dot is formed on the color dot and a pixel in which the color dot is formed on the background dot are mixed so as to form an area where the color image and the background image overlap.

With such a printing method, it is possible to make a color image easy to see from both sides while printing a background image.

BRIEF DESCRIPTION OF THE DRAWINGS

The invention will be described with reference to the accompanying drawings, wherein like numbers reference like elements.

FIG. 5A illustrates the positions of a head and how dots are formed in passes 1 to 4, and FIG. 5B illustrates the position of a head and how dots are formed in passes 1 to 8.

FIG. 11A is an illustration of the manner of dots viewed from the front side, and FIG. 11B is an illustration of the manner of dots viewed from the back side.

FIG. 16A is an illustration of the manner of dots viewed from the front side. FIG. 16B is an illustration of the manner of dots viewed from the back side.

DESCRIPTION OF EXEMPLARY EMBODIMENTS

Configuration of Apparatus

Figure 1:
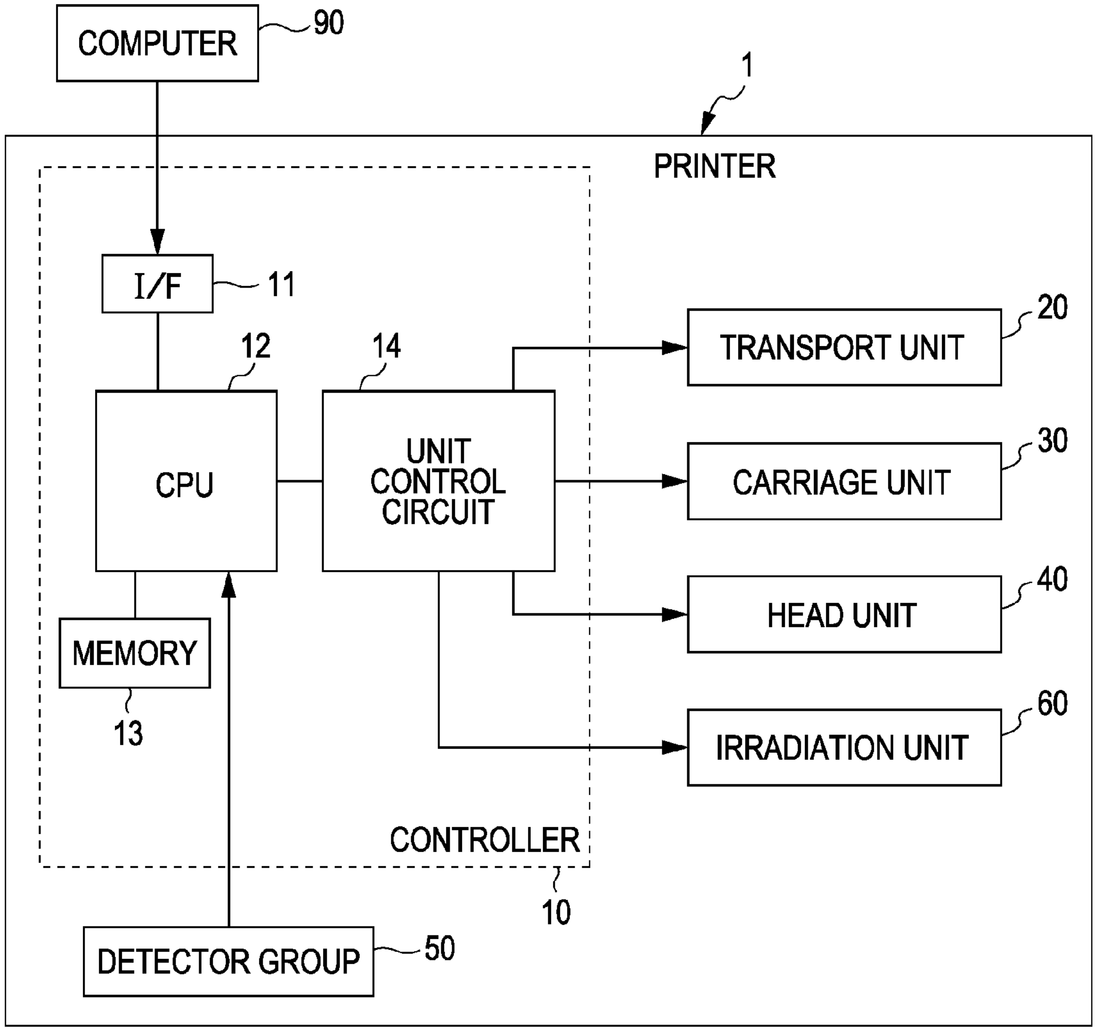
FIG. 1 is a block diagram of the overall configuration of a printer.
Figure 2A:
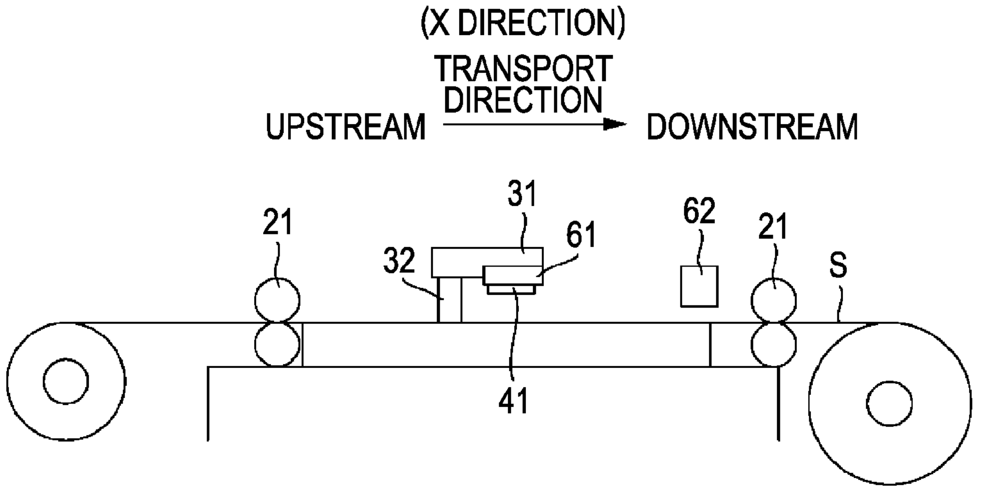
FIG. 2A is a schematic sectional view of the printer.
Figure 2B:
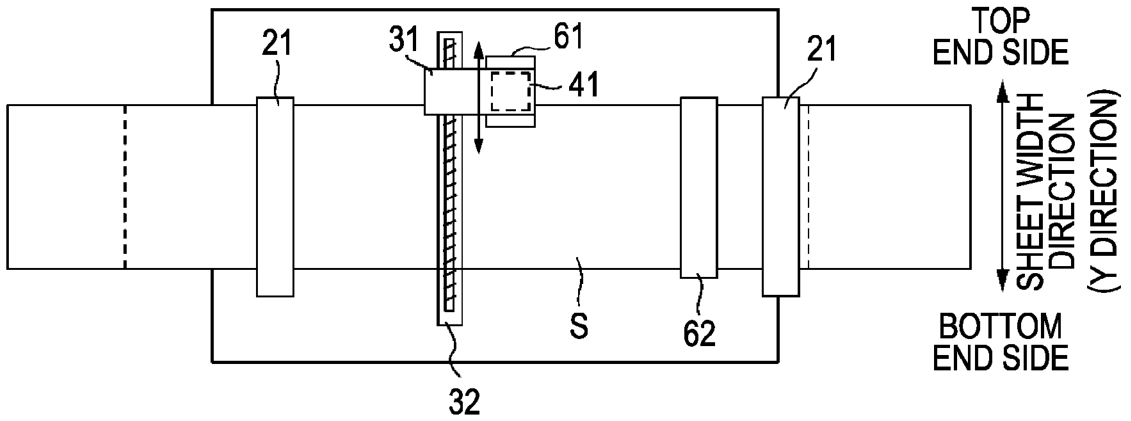
FIG. 2B is a schematic top view of the printer.

FIG. 1 is a block diagram of the overall configuration of a printer 1, FIG. 2A is a schematic sectional view of the printer 1, and FIG. 2B is a schematic top view of the printer 1. Hereinafter, assuming that the printing apparatus is an ink jet printer (the printer 1), embodiments will be described taking, as an example, a printing system in which a computer 90 is connected to the printer 1.

A controller 10 is a control unit for controlling the printer 1. An interface 11 is provided for transmitting and receiving data between the computer 90 and the printer 1. A central processing unit (CPU) 12 is an arithmetic processing unit for controlling the entire printer 1. A memory 13 is provided for securing an area in which programs for use by the CPU 12 are stored, a workspace, and so on. The CPU 12 controls each unit through a unit control circuit 14. Note that a detector group 50 monitors the conditions in the printer 1, and the controller 10 controls each unit on the basis of the detection result.

A transport unit 20 transports a medium S (rolled sheet of paper or the like) from the upstream side to the downstream side in a direction (a transport direction) in which the medium S moves. The medium S in the rolled form before printing is supplied to a print area with transport rollers 21 driven by a motor, and then the printed medium S is rolled up by a rolling-up mechanism so as to be in the rolled form once again. Note that, during printing, the medium S located in the print area is attracted by vacuum from below, so that the medium S can be held in a predetermined position.

A carriage unit 30 causes a head to reciprocate in the sheet width direction. The carriage unit 30 includes a carriage 31 that carries a head, and a carriage moving mechanism 32 for causing the carriage to reciprocate.

A head unit 40 includes the head provided in the carriage 31. A plurality of nozzles that are ink discharge portions are provided on the undersurface of the head. In this embodiment, ultraviolet (UV) ink is discharged from the nozzles. UV ink has a property of being cured when irradiated with UV light.

An irradiation unit 60 is configured to apply UV light to UV ink discharged onto a medium. The irradiation unit 60 of this embodiment includes pre-curing irradiation units 61 and a main curing irradiation unit 62.

The pre-curing irradiation units 61 are provided in the carriage 31, and are movable together with the head. The pre-curing irradiation unit 61 applies UV light having such an intensity as to cure (preliminarily cure) the surface of UV ink such that UV ink dots that have landed on the medium do not spread into each other. For example, a light emitting diode (LED) or the like is adopted as the pre-curing irradiation unit 61. The controller 10 causes the pre-curing irradiation unit 61 to apply UV light while causing the carriage 31 to move, thereby preliminarily curing UV ink in the print area.

The main curing irradiation unit 62 is provided on the downstream side in the X direction of the print area, and can apply UV light covering the full width of a medium. The main curing irradiation unit 62 applies UV light having such an intensity as to be able to fully cure (completely solidify) UV ink on the medium. For example, a UV lamp is adopted as the main curing irradiation unit 62. The controller 10 causes the main curing irradiation unit 62 to apply UV light while causing the medium to be transported, thereby curing an image formed of UV ink.

When printing, the printer 1 alternately repeats an operation (pass) of moving the carriage 31 in the moving direction, and a transportation operation. In each pass, the printer 1 discharges ink from the head to form an image on a medium, and causes the image to be irradiated with UV light from the pre-curing irradiation unit 61, so that the image is preliminarily cured. Repeating the pass and the transportation operation as such enables combined images to be formed on a medium.

By repeating the pass and the transportation operation, an image formed in the print area is gradually transported toward the main curing irradiation unit 62. When the image has been transported to a position at which the image faces the main curing irradiation unit 62, the image is irradiated with UV light from the main curing irradiation unit 62, so that the image is fully cured.

Configuration of Undersurface of Carriage

Figure 3:
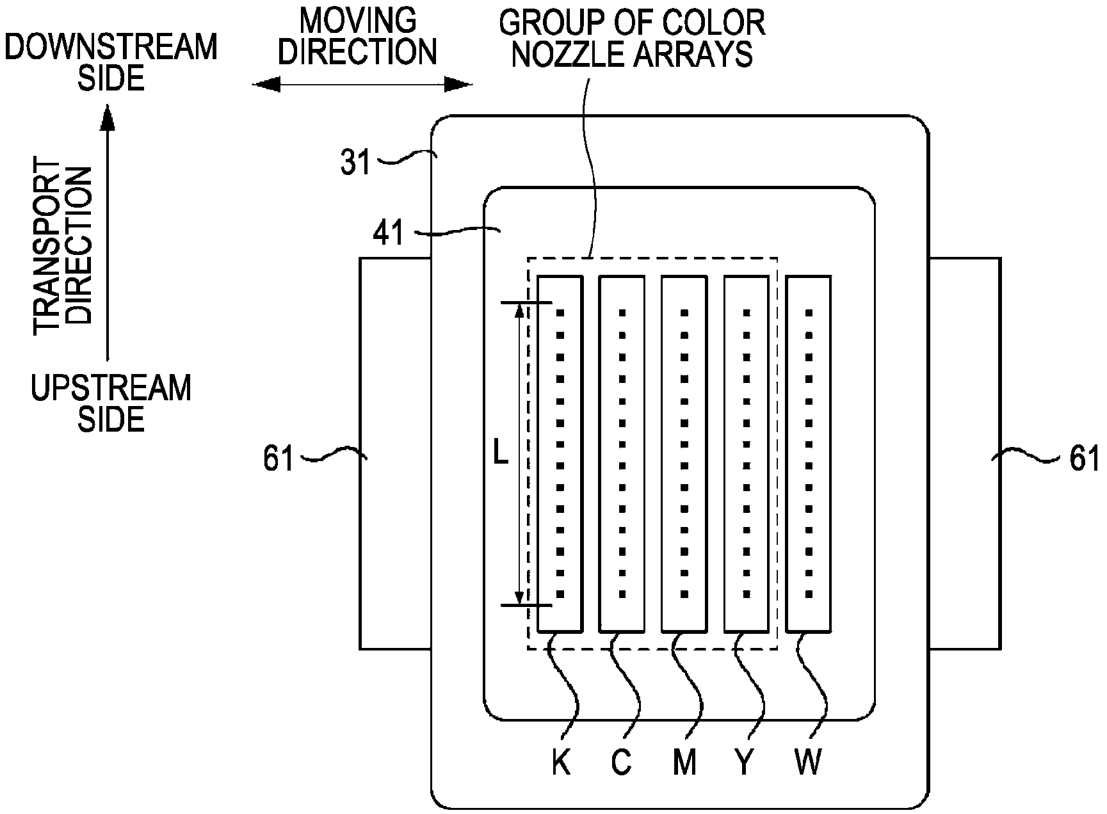
FIG. 3 is a schematic view of the undersurface of a carriage.

FIG. 3 is a schematic view of the undersurface of the carriage.

The head 41 is provided on the undersurface of the carriage 31. The head 41 is provided with five nozzle rows. The five nozzle arrays are a black nozzle array (K) for discharging black ink, a cyan (C) nozzle array for discharging cyan ink, a magenta (M) nozzle array for discharging magenta ink, a yellow (Y) nozzle array for discharging yellow ink, and a white (W) nozzle array for discharging white ink. The black nozzle array, the cyan nozzle array, the magenta nozzle array, and the yellow nozzle array are nozzle arrays (color nozzle arrays) that discharge color ink for forming a color image. The white nozzle array is a nozzle array that discharges white ink for forming a background image (ink for background).

Note that the white ink is special ink used for forming a color image on a transparent medium. If a color image is singly formed on a transparent medium, the visibility of the color image is not good. To address this, in addition to a color image, a background image is formed using white ink. This improves the contrast of the color image, or improves the discernability of the color image, increasing the visibility of the color image. For this reason, white ink completely differs from color ink with respect to how it is used.

Each nozzle array is made up of 180 nozzles. The 180 nozzles of each nozzle array are aligned along the transport direction at a predetermined nozzle pitch, and are aligned at an interval of 1/180 inch in this embodiment (that is, the length indicated by L in FIG. 3 is 1 inch). Therefore, intermittent discharge of ink from each nozzle array causes formation of dot rows at intervals of 1/180 inches along the transport direction every time the carriage 31 moves in the moving direction (every one pass).

Two pre-curing irradiation units 61 are capable of irradiating an area 1 inch wide (corresponding to L) along the transport direction with UV light. The irradiation area of the pre-curing irradiation unit 61 and the discharge area of ink of each nozzle array are located side by side in the moving direction. Accordingly, immediately after ink is discharged onto a medium from the nozzle array in a certain pass, one pre-curing irradiation unit can irradiate the ink (dot) that has landed on the medium with UV light.

Reference Explanation

Interlace Printing

Figure 4:
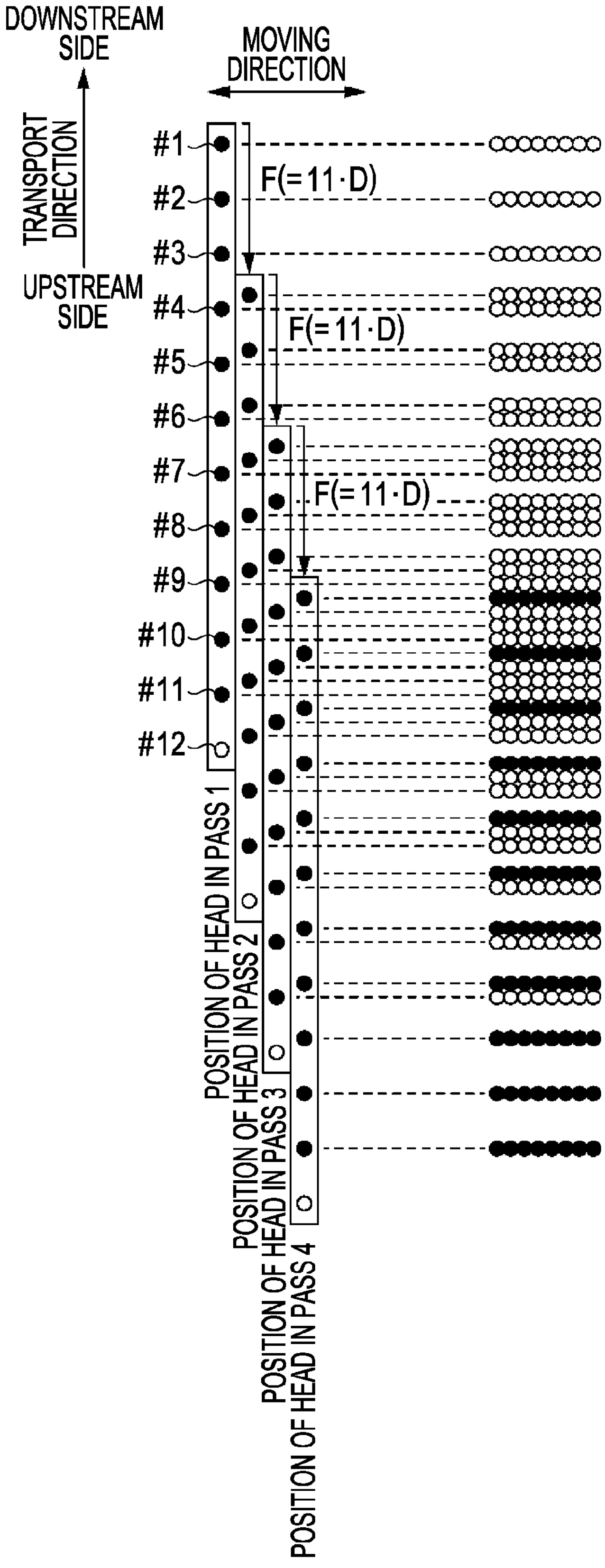
FIG. 4 is an illustration of interlace printing.

FIG. 4 is an illustration of interlace printing. FIG. 4 illustrates the positions of the head (nozzle array) and how dots are formed in passes 1 to 4.

For the sake of explanation, only one nozzle array among a plurality of nozzle arrays is illustrated and the number of nozzles is also decreased (here 12 nozzles). The nozzles indicated by black circles in FIG. 4 are those that can discharge ink. On the other hand, the nozzles indicated by white circles are those that cannot discharge ink. For convenience, the head (the nozzle row) is illustrated as moving with respect to a medium. However, FIG. 4 illustrates relative positions between the head and the medium; in reality, the medium is transported in the transport direction. Also, for the sake of explanation, only several dots (indicated by round marks in FIG. 4) are illustrated as being formed using each nozzle. In reality, ink droplets are intermittently discharged from the nozzle moving in the moving direction, and therefore a large number of dots are aligned in the moving direction. This row of dots is also called a raster line. The dots indicated by black circles are those formed in the last pass, and the dots indicated by white circles are those formed in the preceding passes.

The term "interlace printing" refers to a printing method as follows. That is, a nozzle pitch k is 2 or more, and a raster line that is not recorded is sandwiched between raster lines recorded in one pass. For example, in the printing method illustrated in FIG. 4, three raster lines are sandwiched between the raster lines formed in one pass.

In the interlace printing, every time a medium is transported in the transport direction by a constant transport amount F, each nozzle records a raster line just above a raster line recorded in the immediately preceding pass. In order to perform recording with a constant transport amount in such a manner, the following conditions are to be satisfied: (1) The number N (integer) of nozzles capable of discharging ink is coprime to k; and (2) The transport amount F is set to ND.

In FIG. 4, a nozzle array has 12 nozzles arranged in the transport direction. The nozzle pitch k of the nozzle array is 4. Therefore, in order to satisfy the condition for interlace printing, "N is coprime to k", 11 nozzles (nozzle #1 to nozzle #11), not all the nozzles, are used. Since 11 nozzles are used, a medium is transported by a transport amount of 11D. As a result, dots are formed on the medium at dot intervals of 720 dpi (=D) using the nozzle array with a nozzle pitch of 180 dpi (4D). Note that, in the case of interlace printing using a nozzle array including 180 nozzles, a pass using 179 nozzles and a transport operation with a transport amount of 179D are alternately repeated.

In the case of interlace printing, k passes are needed to complete successive raster lines in the width of the nozzle pitch. For example, four passes are needed to complete four raster lines that are successive at dot intervals of 720 dpi using a nozzle array with a nozzle pitch of 180 dpi. FIG. 4 illustrates that successive raster lines are formed at dot intervals of D upstream in the transport direction of the raster line (the raster line indicated by the arrow in the figure) formed by using the nozzle #3 in pass 3.

In the case of interlace printing of a color image without forming a background image, the color nozzle array of each color (a cyan nozzle array, a magenta nozzle array, a yellow nozzle array, and a black nozzle array) operates as illustrated in FIG. 4. That is, the color nozzle array of each color discharges ink from its nozzles #1 to #11 (nozzles #1 to #179 in cases where each nozzle array includes 180 nozzles). In this case, the positions in the transport direction of the nozzles discharging ink overlap among the color nozzle arrays of the respective colors. For example, the positions in the transport direction of the nozzles discharging cyan ink overlap the positions in the transport direction of the nozzles discharging magenta ink.

However, in existing techniques, it is not assumed that, in the case of forming a color image while forming a background image, the positions in the transport direction of color nozzles discharging color ink overlap the positions in the transport direction of white nozzles discharging white ink. With the existing techniques, actually, the positions in the transport direction of the color nozzles do not overlap the positions in the transport direction of white nozzles, as to be described later regarding front surface printing and back surface printing. This point will be described later.

Overlap Printing

Figures 5A, 5B:
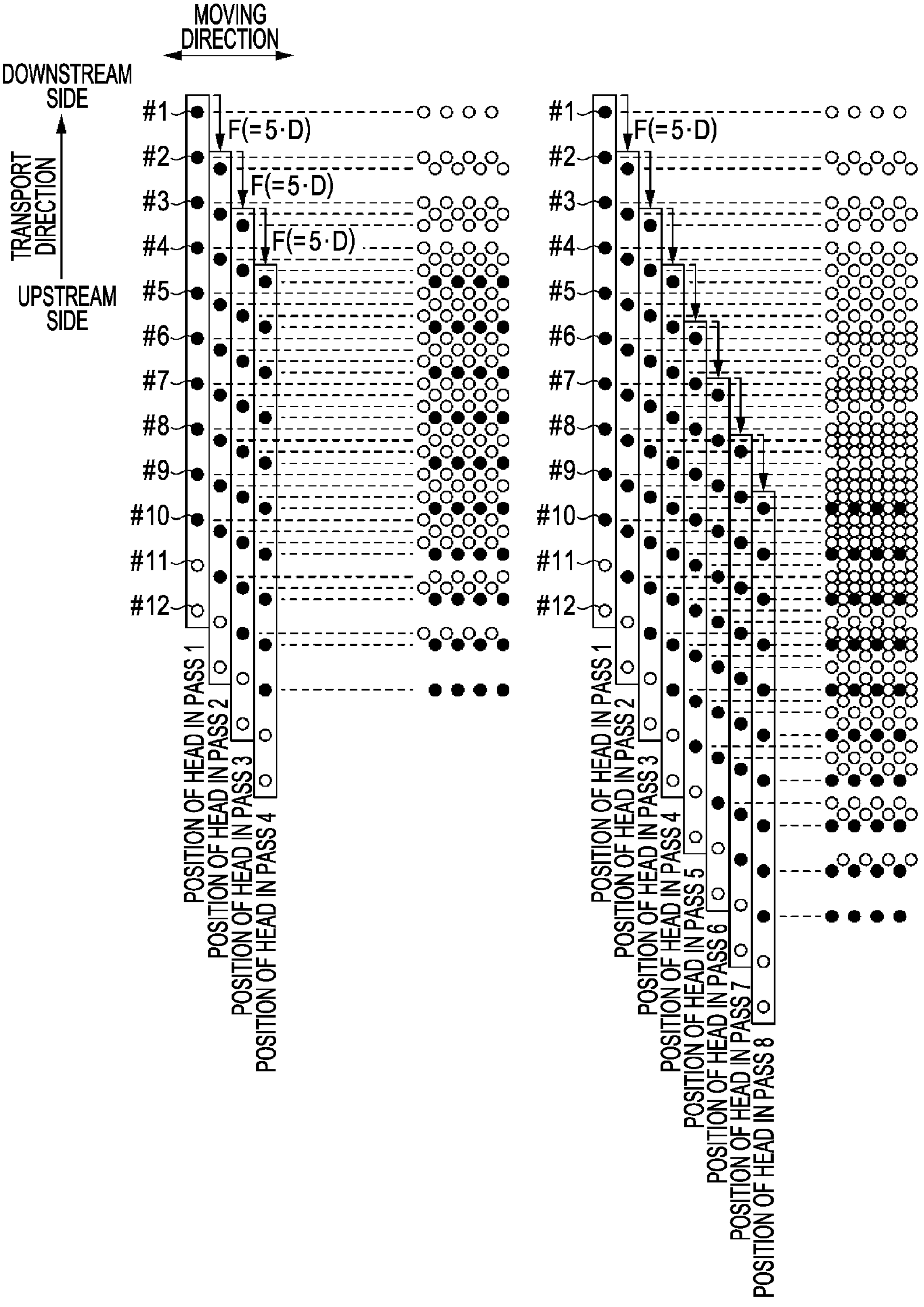
FIG. 5A and FIG. 5B are illustrations of overlap printing.

FIG. 5A and FIG. 5B are illustrations of overlap printing. FIG. 5A illustrates the positions of a head and how dots are formed in passes 1 to 4, and FIG. 5B illustrates the position of a head and how dots are formed in passes 1 to 8.

The term "overlap printing" refers to a printing method of forming a raster line by using a plurality of nozzles. For example, in the printing method in FIG. 5A and FIG. 5B, each raster line is formed by using two nozzles.

In overlap printing, every time a medium is transported in the transport direction by the constant transport amount F, dots are formed by using each nozzle such that the dots are spaced at intervals of several dots. Then, in another pass, dots are formed between the dots formed with spacing therebetween, by using another nozzle, in such a manner as to fill the spacing, so that one raster line is formed by using a plurality of nozzles. Thus, when one raster line is formed in M passes, it is defined as "overlap number M".

In FIG. 5A and FIG. 5B, dots are formed by using each nozzle such that the dots are spaced at intervals of 1 dot, and therefore dots are formed in odd-numbered pixels or even-numbered pixels in every pass. Since one raster line is formed by using two nozzles, the overlap number M=2.

In overlap printing, in order to perform recording with a constant transport amount, the following conditions are to be satisfied: (1) N/M is an integer; (2) N/M is coprime to k; and (3) The transport amount F is set to (N/M)D.

In FIG. 5A and FIG. 5B, a nozzle array has 12 nozzles arranged in the transport direction. However, the nozzle pitch k of the nozzle array is 4. Therefore, to satisfy the condition for overlap printing, "N/M is coprime to k", all the nozzles cannot be used. To address this, overlap printing is performed using 10 nozzles among 12 nozzles. Since 10 nozzles are used, a medium is transported by a transport amount of 5D. As a result, for example, dots are formed on a medium at dot intervals of 720 dpi (=D) using a nozzle array with a nozzle pitch of 180 dpi (4D).

In the case of forming one raster line by using M nozzles, k×M passes are needed to complete raster lines corresponding to the nozzle pitch. For example, with reference to FIG. 5A and FIG. 5B, since one raster line is formed by using two nozzles, eight passes are needed to complete four raster lines. FIG. 5A and FIG. 5B illustrate that successive raster lines are formed at dot intervals of D upstream in the transport direction of the raster line formed by using the nozzle #9 in pass 1 and the nozzle #4 in pass 5.

With reference to FIG. 5A and FIG. 5B, dots are formed in odd-numbered pixels by using each nozzle in pass 1, dots are formed in even-numbered pixels by using each nozzle in pass 2, dots are formed in odd-numbered pixels by using each nozzle in pass 3, and dots are formed in even-numbered pixels by using each nozzle in pass 4. That is, in four passes of the first half, dots are formed in the order of the odd-numbered pixels, even-numbered pixels, odd-numbered pixels, and even-numbered pixels. Then, in four passes (pass 5 to pass 8) of the second half, dots are formed in the order opposite to that of the four passes of the first half, that is, dots are formed in the order of the even-numbered pixels, odd-numbered pixels, even-numbered pixels, and odd-numbered pixels. Note that the order of formation of dots in and after pass 9 is the same as that in and after pass 1.

Front Surface Printing, Back Surface Printing

Figure 6A:
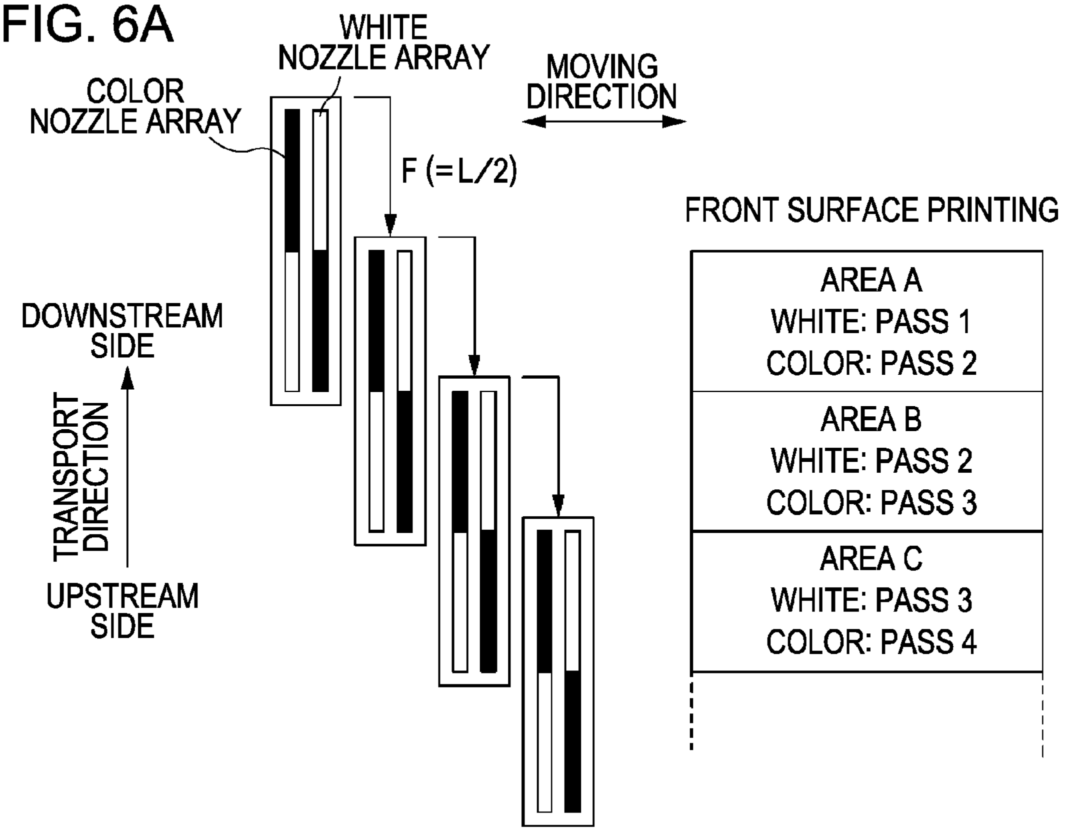
FIG. 6A is an illustration of front surface printing.

FIG. 6A is an illustration of front surface printing. The term "front surface printing" refers to printing in which, after a background image is formed on a medium, a color image is formed on the background image.

When front surface printing is carried out, half of nozzles (nozzles #1 to #90) on the downstream side in the transport direction are used in a color nozzle array (for example, a cyan nozzle array), whereas half of nozzles (nozzles #91 to #180) on the upstream side in the transport direction are used in a white nozzle array. By alternately repeating the pass using nozzles in such a manner and the transport operation, a color image is formed on a background image formed in white ink. For example, in an area A in FIG. 6A, a background image is formed in the pass 1, and then a color image is formed in the pass 2. Thereby, the color image is formed on the background image.

Figure 6B:
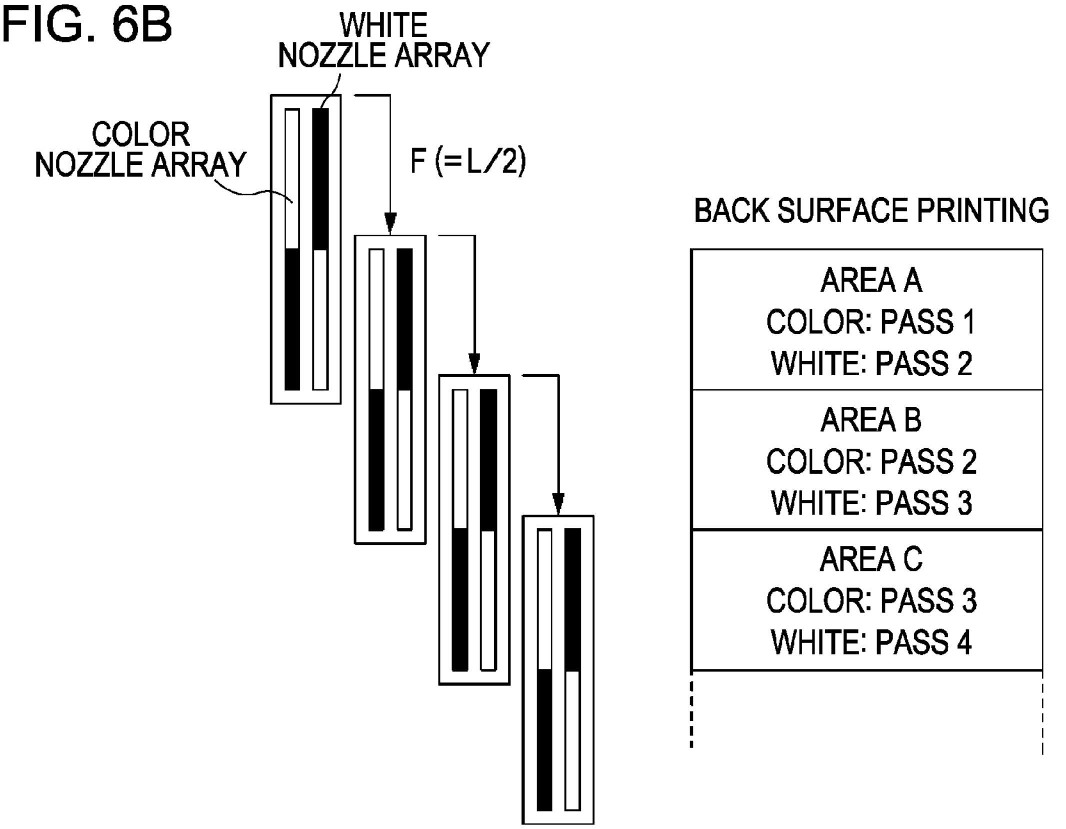
FIG. 6B is an illustration of back surface printing.

FIG. 6B is an illustration of back surface printing. The term "back surface printing" means printing in which after a color image is formed on a medium, a background image is formed on the color image. Back surface printing is carried out mainly using a transparent medium, and the color image of a printed matter obtained by back surface printing is seen through a transparent medium.

When back surface printing is carried out, half of nozzles (nozzles #91 to #180) on the upstream side in the transport direction are used in a color nozzle array, whereas half of nozzles (nozzles #1 to #90) on the downstream side in the transport direction are used in a white nozzle array. By alternately repeating the pass using nozzles in such a manner and the transport operation, a background image is formed on a color image. For example, in the area A of FIG. 6B, a color image is formed in the pass 1, and then a background image is formed in the pass 2. Thereby, the background image is formed on the color image.

Figure 7:
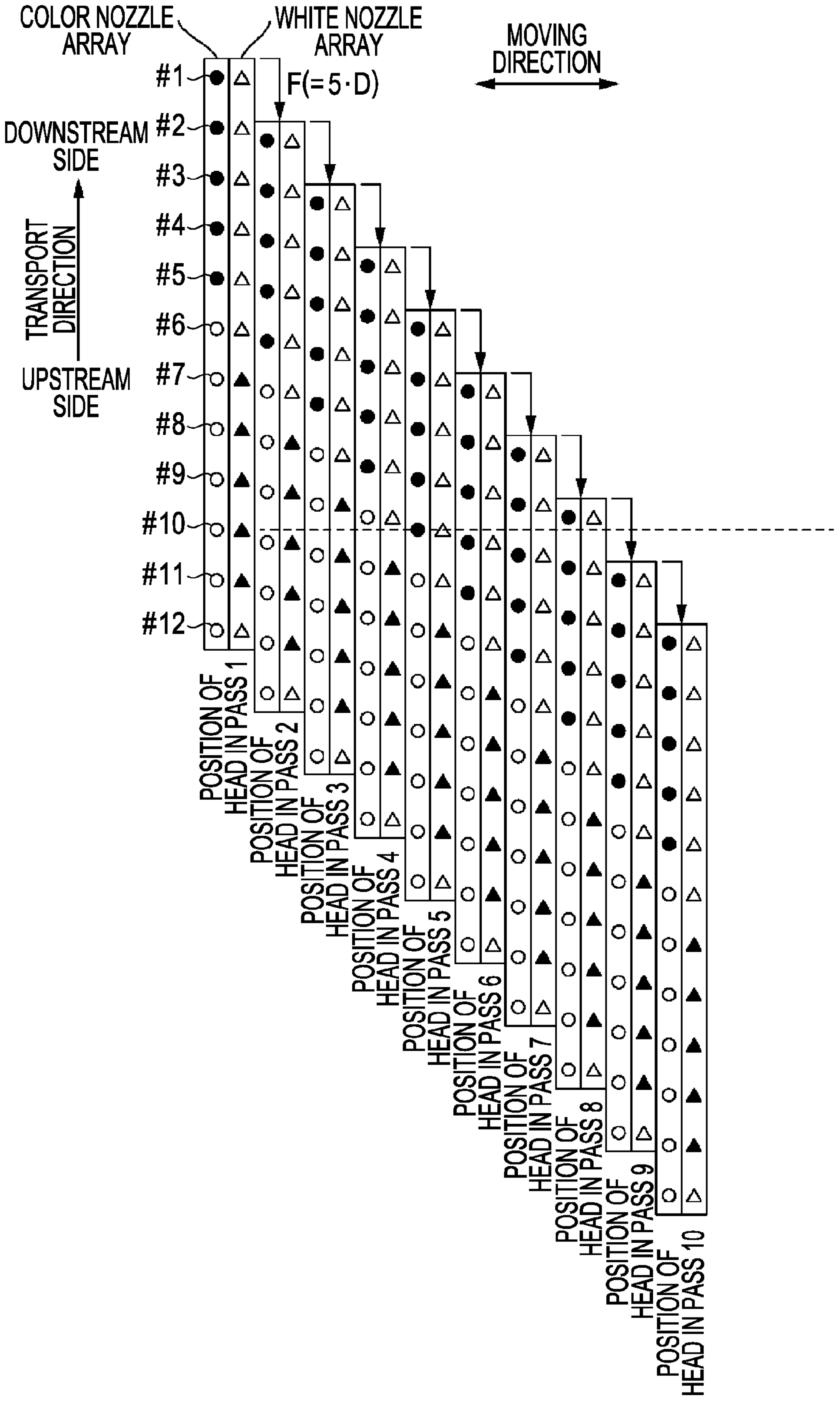
FIG. 7 is an illustration of front surface printing using interlace printing.

FIG. 7 is an illustration of front surface printing using interlace printing. In FIG. 7, the nozzle of a color nozzle array is indicated by a round mark, and the nozzle of a white nozzle array is indicated by a triangle.

In the case of front surface printing using interlace printing, half of nozzles (nozzles #1 to #6) on the downstream side in the transport direction are used in a color nozzle array included in a group of color nozzle arrays, whereas half of nozzles (nozzles #7 to #12) on the upstream side in the transport direction are used in a white nozzle array. In order to satisfy the conditions described above: (1) The number N (integer) of nozzles capable of discharging ink is coprime to k; and (2) The transport amount F is set to ND, in the case of carrying out interlace printing by using six nozzles, ink is discharged from five nozzles, and a medium is transported by a transport amount of 5D.

At any raster line position, after a white dot is formed by using a nozzle (white nozzle) of a white nozzle array, a color dot is formed by using a nozzle (color nozzle) of a color nozzle array. For example, in the raster line at the position indicated by a dotted line in FIG. 7, after a white dot is formed in the pass 1, a color dot is formed in the pass 5. For this reason, a color image can be formed on a background image.

As mentioned above, in the case of forming a background image and a color image, existing techniques prevent an overlap of the positions in the transport direction of the color nozzles discharging color ink and the positions in the transport direction of the white nozzles discharging the white ink in both a front surface printing case and a back surface printing case. This is because existing techniques assume that a color image is viewed from one side of a medium and therefore a color image needs to be arranged on the side of a person viewing the image in every area where a color image and a background image overlap. In other words, existing techniques do not assume that a color image is viewed from both sides of a medium, and do not assume at all to mix pixels in which a white dot is formed on a color dot and pixels in which a color dot is formed on a white dot in an area where a color image and a background image overlap.

First Embodiment

Outline

Figure 8A:
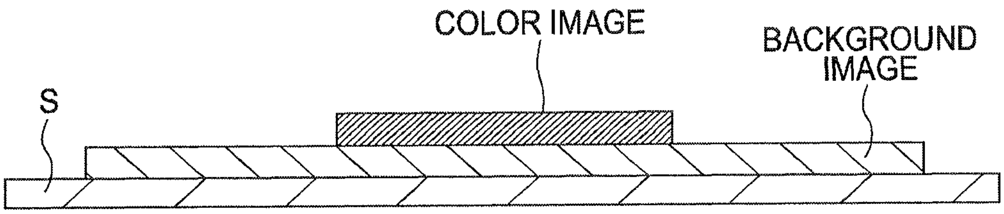
FIG. 8A is an illustration of an image formed by front surface printing.

FIG. 8A is an illustration of an image formed by front surface printing. In the case where front surface printing has been carried out, when viewed from the front side of a medium, a color image is printed on a background image and therefore it is easy to see the color image. When viewed from the back side of the medium, however, the color image is hard to see because it is hidden under the background image.

Figure 8B:
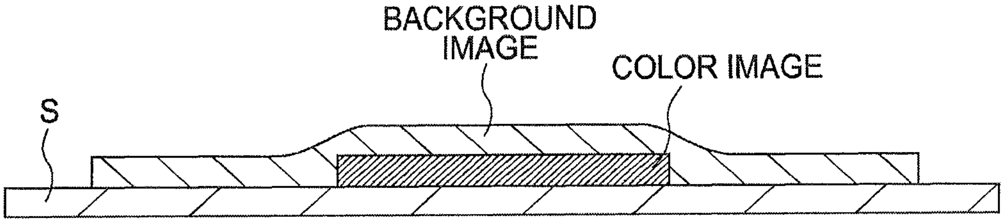
FIG. 8B is an illustration of an image formed by back surface printing.

FIG. 8B is an illustration of an image formed by back surface printing. In the case where back surface printing has been carried out, when viewed from the back side of a medium, a color image is printed on a background image and therefore it is easy to see the color image. When viewed from the front side of the medium, however, the color image is hard to see because it is hidden under the background image.

Figure 8C:
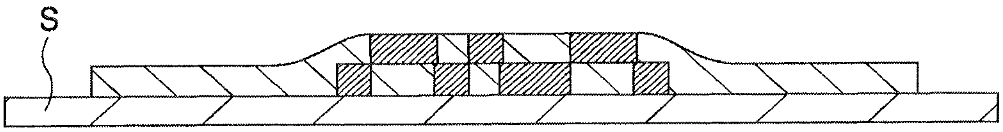
FIG. 8C is an illustration of an image formed according to this embodiment.

FIG. 8C is an illustration of an image formed according to this embodiment. According to this embodiment, pixels in which a white dot is formed on a color dot and pixels in which a color dot is formed on a white dot are mixed in an area where a color image and a background image overlap. Thanks to this, it becomes easy to see a color image from both sides of a medium although a background image is printed.

Hereinafter, a method of printing such an image will be described.

Printing Method

Figure 9:
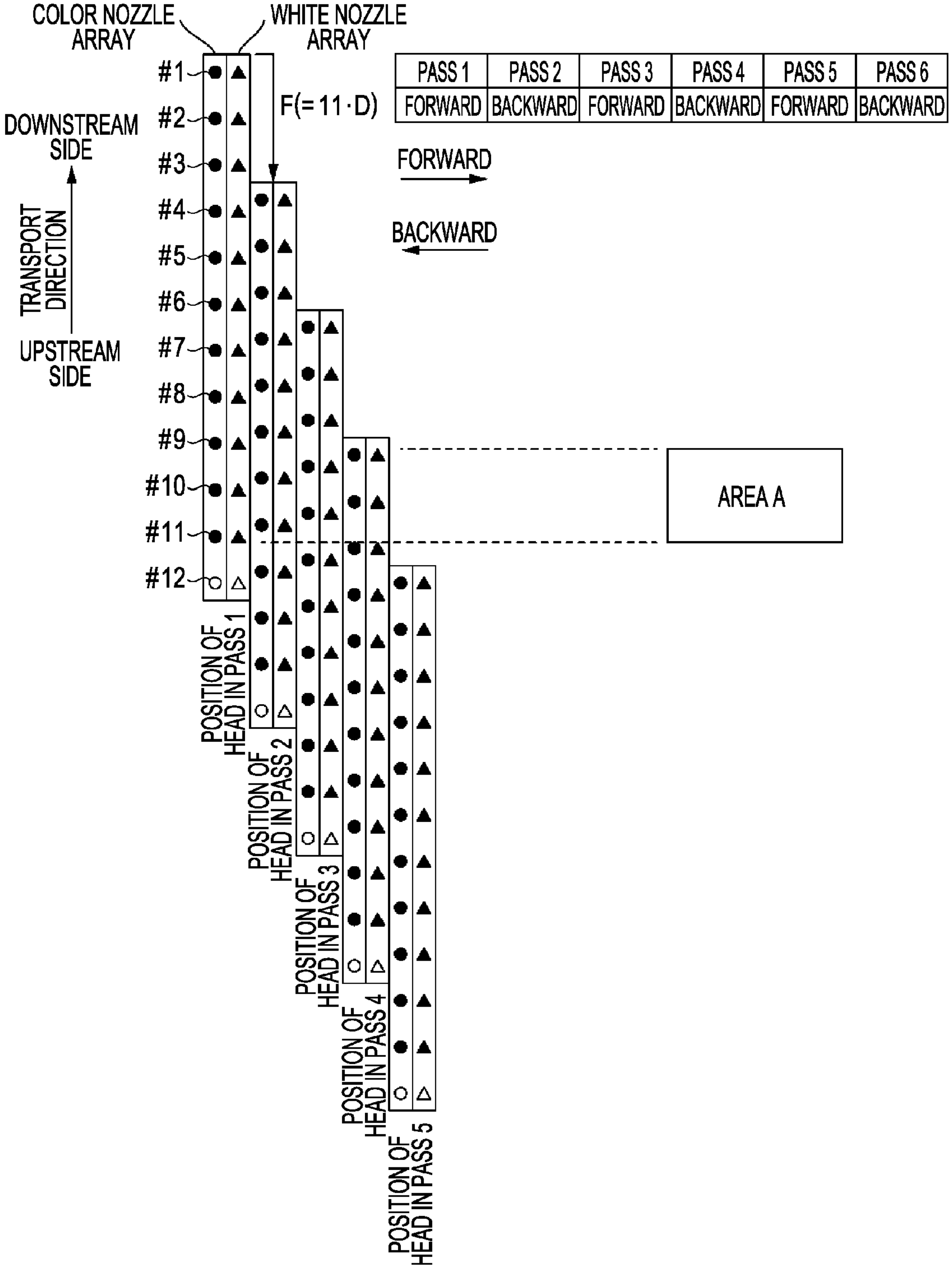
FIG. 9 is an illustration of a printing method of a first embodiment.

FIG. 9 is an illustration of a printing method of the first embodiment. With attention focused on operation of a color nozzle array and operation of a white nozzle array, interlace printing illustrated in FIG. 4 is carried out in either operation.

In the aforementioned front surface printing and back surface printing, the positions in the transport direction of color nozzles discharging color ink is prevented from overlapping the positions in the transport direction of white nozzles discharging white ink. By contrast, in this embodiment, the positions in the transport direction of color nozzles (nozzles #1 to #11) discharging color ink overlap the positions in the transport direction of white nozzles (nozzles #1 to #11) discharging white ink. For this reason, in this embodiment, the number of nozzles discharging ink increases, and, as a result, the transport amount also increases.

Bidirectional printing is carried out in this embodiment. As illustrated in FIG. 9, a carriage moves forward in odd-numbered passes (pass 1, pass 3, . . . ), and moves backward in even-numbered passes (pass 2, pass 4, . . . ).

Figure 10A:
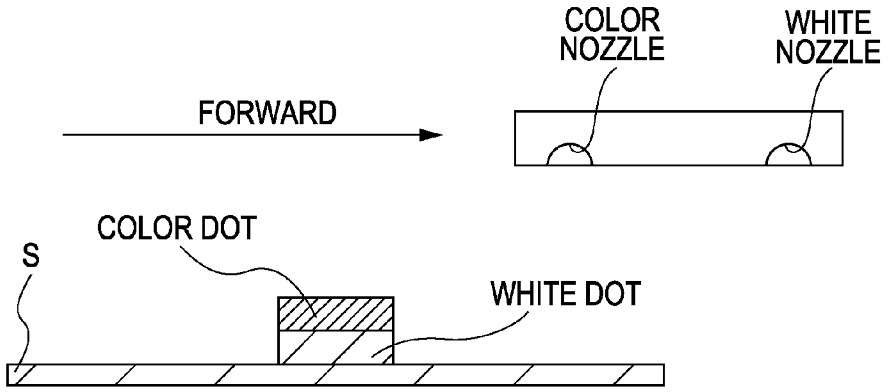
FIG. 10A and FIG. 10B are illustrations of the relationship between a color dot and a white dot in terms of time during bidirectional printing.
Figure 10B:
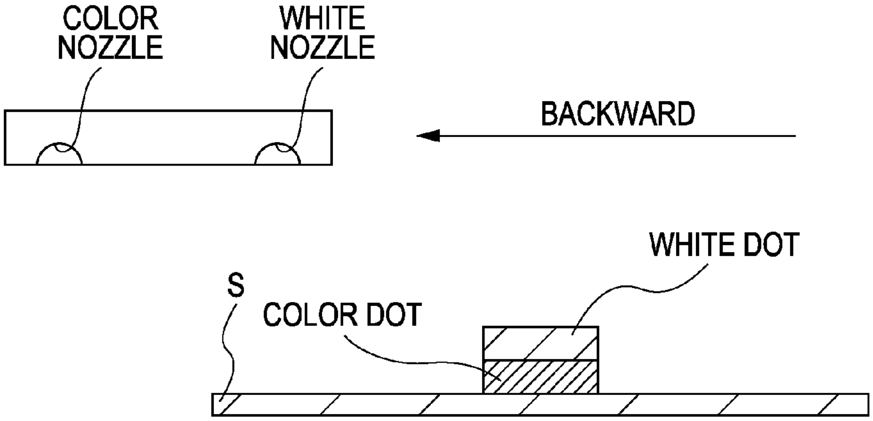

FIG. 10A and FIG. 10B are illustrations of the relationship between a color dot and a white dot in terms of time during bidirectional printing. As illustrated in FIG. 10A, in a pass in which a carriage moves forward (odd-numbered pass), a white nozzle is positioned downstream of a color nozzle in the moving direction of the carriage, and therefore a color dot is formed on a white dot. On the other hand, as illustrated in FIG. 10B, in a pass in which a carriage moves backward (even-numbered pass), a color nozzle is positioned downstream of a white nozzle in the moving direction, and therefore a white dot is formed on a color dot.

Figure 11A:
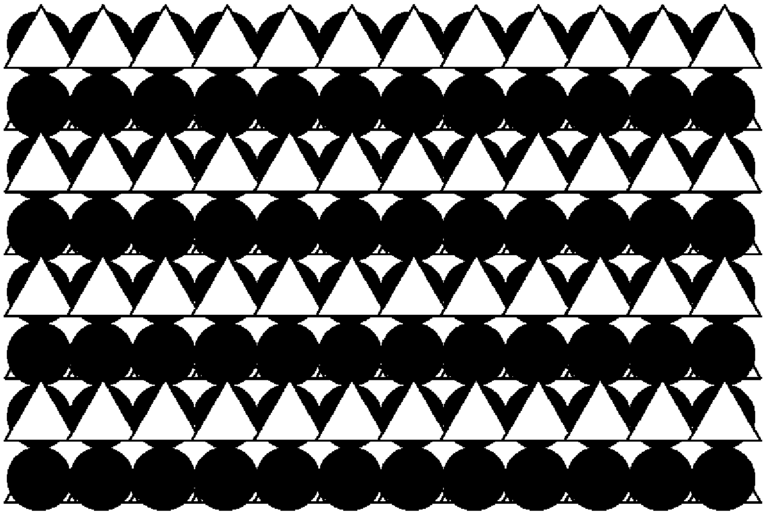
FIG. 11A and FIG. 11B are illustrations of the manner of dots of eight raster lines in an area of FIG. 9.
Figure 11B:
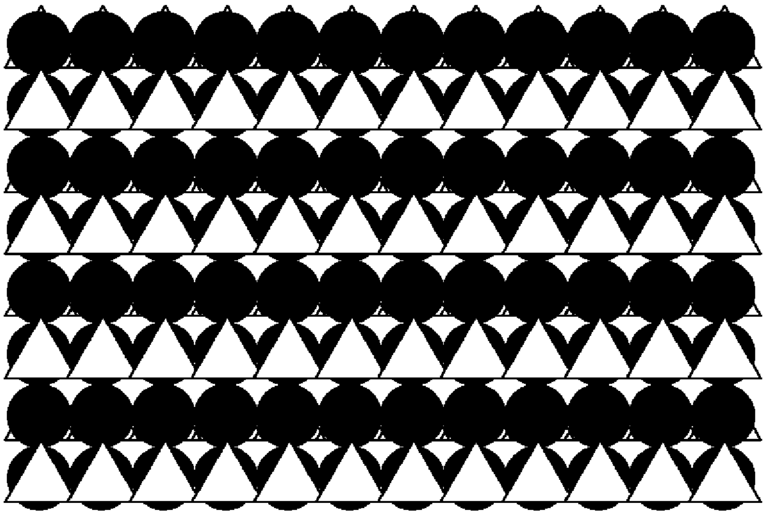

FIG. 11A and FIG. 11B are illustrations of the manner of dots of eight raster lines in the area A of FIG. 9. FIG. 11A is an illustration of the manner of dots viewed from the front side. FIG. 11B is an illustration of the manner of dots seen from the back side. In FIG. 11A and FIG. 11B, color dots are represented by black circles, white dots are represented by white triangles, and the positional relationship between the black dot and the white dot is represented by the positional relationship between the black circle and the white triangle. Here, for the sake of simplicity, a color dot and a white dot are formed in every pixel.

Even-numbered raster lines counting from the top in the area A are formed when a carriage moves forward. Accordingly, color dots are formed on white dots in the even-numbered raster lines. For example, the raster line positioned second from the top in the area A is formed by using the nozzle #4 in the pass 3 in which a carriage moves forward (refer to FIG. 9), and therefore color dots are formed on white dots. For this reason, regarding even-numbered raster lines counting from the top in the area A, when the raster lines are viewed from the front side, it is easy to visually recognize color dots whereas it is hard to visually recognize white dots because the white dots are hidden under the color dots. When the raster lines are viewed from the back side, however, it is easy to visually recognize white dots whereas it is hard to visually recognize color dots because the color dots are hidden under the white dots.

On the other hand, odd-numbered raster lines counting from the top in the area A are formed when a carriage moves backward. Accordingly, white dots are formed on color dots in the odd-numbered raster lines. For example, the raster line positioned first from the top in the area A is formed by using the nozzle #1 in the pass 4 in which a carriage moves backward (refer to FIG. 9), and therefore white dots are formed on color dots. For this reason, regarding odd-numbered raster lines counting from the top in the area A, when the raster lines are viewed from the front side, it is easy to visually recognize white dots whereas it is hard to visually recognize color dots because the color dots are hidden under the white dots. When the raster lines are viewed from the back side, however, it is easy to visually recognize color dots whereas it is hard to visually recognize white dots because the white dots are hidden under the color dots.

That is, with the printing method of the first embodiment, raster lines in which color dots are easy to recognize and raster lines in which color dots are hard to recognize, when viewed from either of front and back sides of a medium, are alternately arranged.

In the aforementioned description, color dots are formed in all the pixels. In reality, however, pixels in which color dots are formed and pixels in which color dots are not formed are provided in accordance with a color image to be printed. Then, the visibility of the color image in such a case will next be described.

Figure 12A:
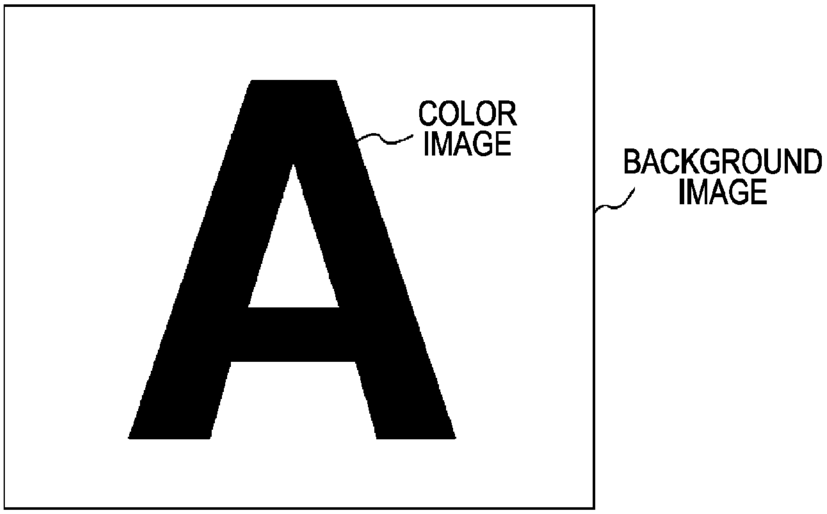
FIG. 12A is an illustration of a color image on image data.

FIG. 12A is an illustration of a color image on image data. Here, it is assumed that a character “A” as a color image, as well as a background image that is a filled image, is printed on a medium. On image data, the character “A”, which is a color image, is a filled image. Therefore, a color dot is formed in each pixel of an area to be filled in color. In other words, the area of the character “A” is an area where a color image and a background image overlap. Note that color dots are not formed but only white dots are formed outside the area of the character “A”.

Figure 12B:
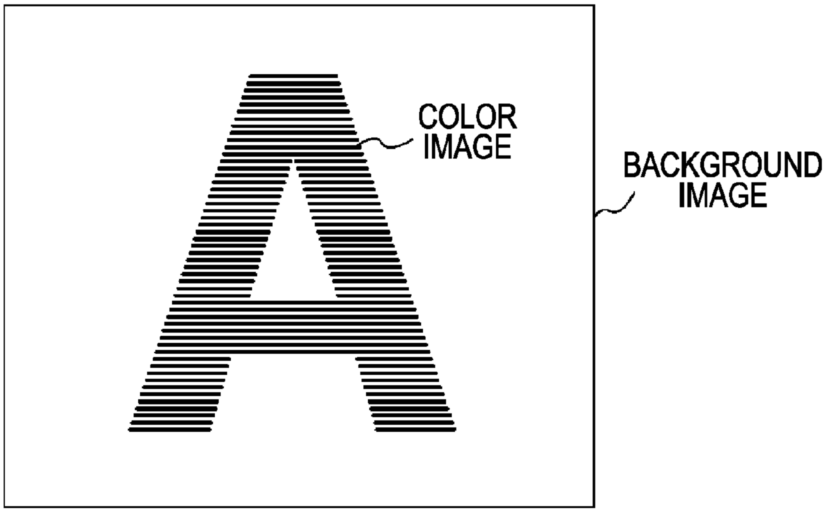
FIG. 12B is an illustration of how a color image printed on a medium appears as viewed.

FIG. 12B is an illustration of how a color image printed on the medium appears as viewed. Color dots are formed in successive raster lines in the area to be filled. As has been described, with the printing method of the first embodiment, raster lines in which color dots are easy to recognize and raster lines in which color dots are hard to recognize, when viewed from either of front and back sides of a medium, are alternately arranged. The width of a raster line is very narrow. Therefore, the printed color image, when macroscopically viewed, can be recognized in such a manner as to be approximately the same as the image data. Thus, as illustrated in FIG. 12B, a color image (character "A") that is approximately the same as image data can be recognized when viewed from either of front and back sides of a medium.

Although the example in which a color image is the character "A" has been described, the color image is not limited to a character (text). In particular, the color image is not limited to one that will become a filled image. For example, a color image may be a natural image. In the case of printing a natural image on a medium, color dots are formed dispersedly. Even in this case, with the printing method of the first embodiment, raster lines in which color dots are easy to recognize and raster lines in which color dots are hard to recognize, when viewed from either of front and back sides of a medium, are alternately arranged. This makes it possible to visually recognize a color image that is approximately the same as its image data.

Overall Processing Flow

Here, the flow of processing in the case of printing image data created on a computer using an image drawing program will be described.

Figure 13A:
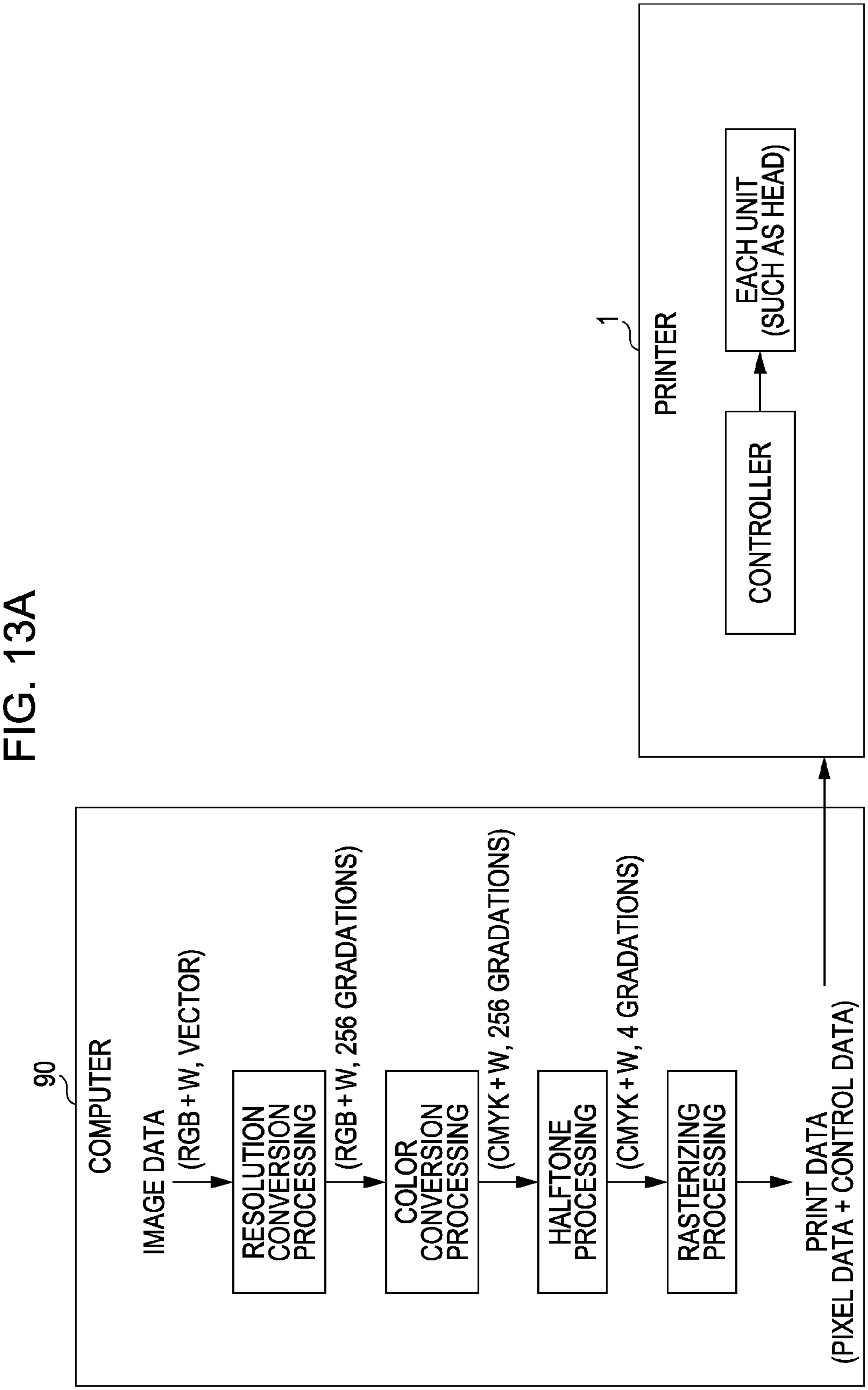
FIG. 13A is a block diagram of the flow of processing of the first embodiment.

FIG. 13A is a block diagram of the flow of processing of this embodiment. A printer driver is pre-installed in the computer 90. The printer driver corresponds to a program for making the computer 90 implement each processing described below. This printer driver may be one that is downloaded via the Internet and installed in the computer 90, or may be one that is obtained by installing in the computer 90 a program stored in a storage medium, such as a digital versatile disk-read only memory (DVD-ROM).

Figure 14:
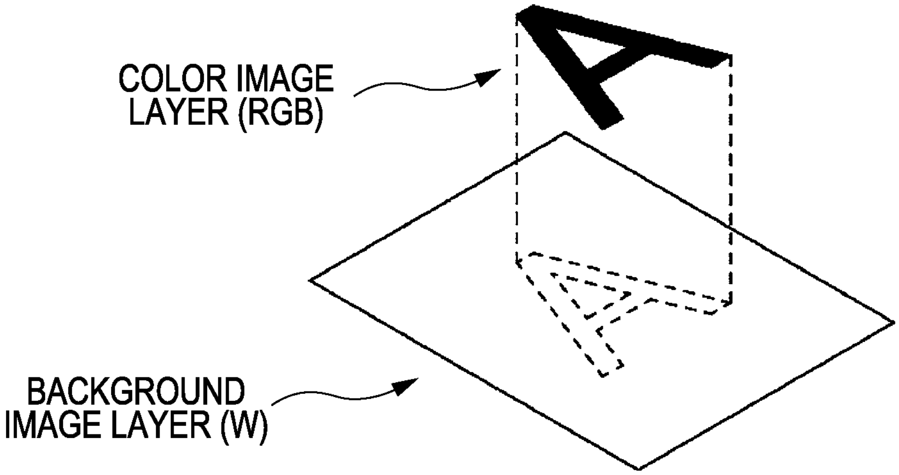
FIG. 14 is an illustration of image data acquired from an image drawing program by a printer driver.

First, the printer driver acquires image data from an image drawing program. Here, assume that the printer driver acquires image data as illustrated in FIG. 14. This image data is data in vector format that is composed of a color image layer representing the character "A", which is a color image of red-green-blue (RGB) color space, and a background image layer representing a background image. As such, a background image is usually managed in a layer different from that of a color image.

The printer driver performs processing of converting the acquired image data (vector format) into a print resolution (resolution conversion processing). For example, in the case where a print resolution is specified as 720×720 dpi, the acquired image data in vector format is converted into image data in bitmap format at a resolution of 720×720 dpi. Note that each pixel data of the image data after the resolution conversion processing is composed of data of 256 gradations for representing a color image in RGB color space, and data representing white in 256 gradations.

After the resolution conversion processing, the printer driver performs processing of converting data in RGB color space into the data in CMYK color space (color conversion processing). The data in CMYK color space is data corresponding to color ink that the printer has. The color conversion processing is performed on the basis of a table (a color conversion lookup table LUT) in which gradation values in RGB color space are associated with gradation values in CMYK color space. Note that data representing the gradation of white already corresponds to the color of ink, and therefore color conversion processing need not be performed on this data.

After the color conversion processing, the printer driver performs processing of converting data of 256 gradations into data of a number of gradations that can be formed by a printer (halftone processing). Through the halftone processing, data representing 256 gradations is converted into 1-bit data representing two gradations and 2-bit data representing four gradations. In the halftone processing, a dither method, gamma correction, an error diffusion method, and so on are used. The data that has been subjected to the halftone processing has a resolution equivalent to the print resolution (for example, 720×720 dpi). In the image data after the halftone processing, 1-bit or 2-bit image data corresponds to every pixel, and this pixel data is data indicating how a dot is formed in each pixel (the presence or absence of a dot, the size of a dot).

After the halftone processing, the printer driver performs processing such that the pixel data arranged in a two-dimensional matrix is rearranged following the order in which dots are to be formed at the time of printing (rasterizing processing). For example, when a pass (dot formation processing) is to be performed several times at the time of printing, pixel data for each pass is extracted, and the pixel data is rearranged following the order of passes.

In this embodiment, as illustrated in FIG. 9, the positions of dots formed from each nozzle in each pass are fixed. Then, in accordance with the position of each nozzle in each pass of FIG. 9, the printer driver extracts pixel data for that nozzle in that pass, and rearranges the pixel data.

Then, the printer driver adds control data suitable for a printing method to the data on which the rasterizing processing has been performed to generate print data, and transmits the print data to a printer. Examples of the control data include transport data representing a transport amount and moving data representing the moving direction (forward or backward) of a carriage.

Upon receiving the print data, the printer controls each unit in accordance with the print data. For example, the controller causes the transport unit 20 to transport a medium by a transport amount represented by transport data, causes the carriage unit 40 to move along a moving direction represented by moving data, and causes ink to be discharged from each nozzle of the head 41 in accordance with pixel data. Thereby, the printer realizes printing processing as illustrated in FIG. 9. As a result, a color image that appears as illustrated in FIG. 12B can be printed on a medium.

According to the first embodiment, raster lines composed of dots that are easy to recognize and raster lines composed of dots that are hard to recognize, when viewed from either of front and back sides of a medium, are alternately arranged. The width of a raster line is very narrow. Therefore, the printed color image, when macroscopically viewed, can be recognized in such a manner as to be approximately the same as the image data.

Figure 13B:
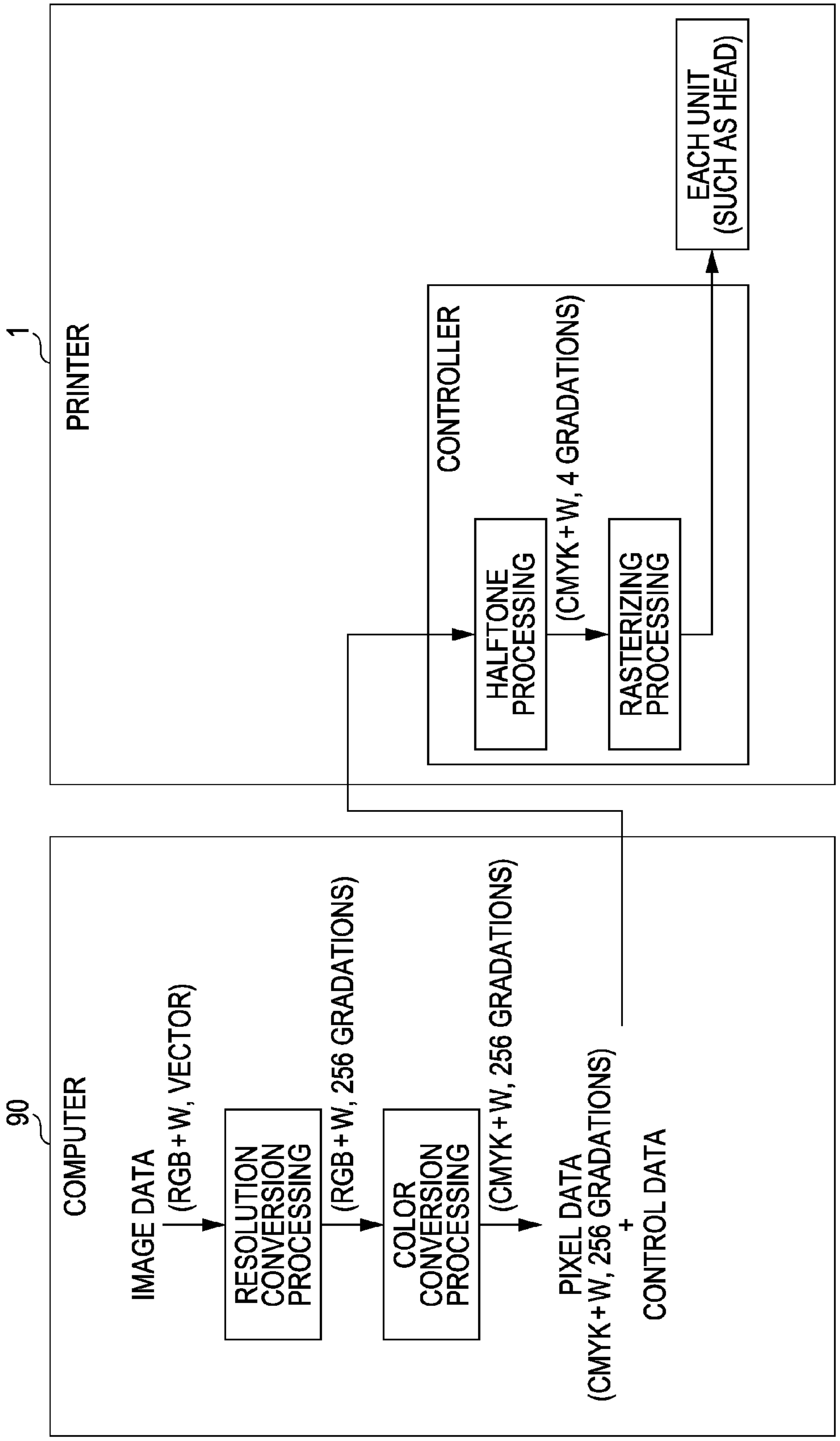
FIG. 13B is a block diagram of the outline of a first modification.

FIG. 13B is a block diagram of the outline of a first modification. In the first modification, the printer 1 performs part of processing that is performed on the side of the computer 90 in the flow illustrated in FIG. 13A. For example, the computer 90 performs the resolution conversion processing and the color conversion processing without performing the halftone processing and the rasterizing processing, and transmits the pixel data and control data after color conversion to the printer 1. Then, the printer 1 performs the halftone processing and rasterizing processing on the basis of the received pixel data and control data. Subsequently, the printer 1 controls each unit in accordance with the control data and causes ink to be discharged from each nozzle of the head 41 in accordance with the pixel data. Thereby, the printer 1 realizes the printing processing as illustrated in FIG. 9.

Figure 13C:
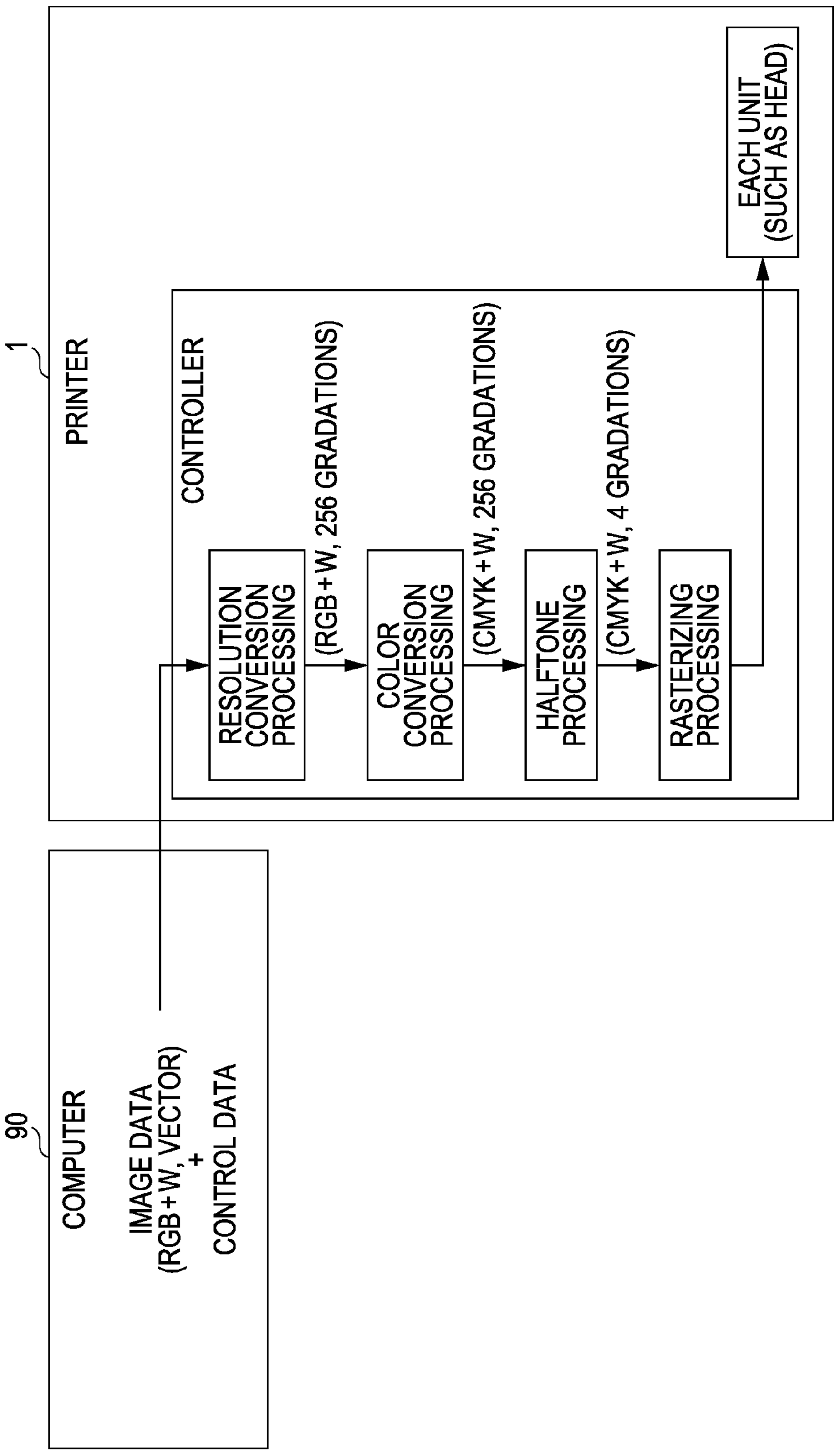
FIG. 13C is a block diagram of the outline of a second modification.

FIG. 13C is a block diagram of the outline of a second modification. In the second modification, the printer 1 performs the processing that is performed on the side of the computer 90 in the flow illustrated in FIG. 13A. The computer 90 only adds control data to image data and transmits these data to the printer 1. Based on the received image data, the printer 1 performs the resolution conversion processing, color conversion processing, halftone processing, and rasterizing processing, thereby generating print data. Subsequently, the printer 1 controls each unit in accordance with the control data and causes ink to be discharged from each nozzle of the head 41 in accordance with the pixel data. Thereby, the printer 1 realizes the printing processing as illustrated in FIG. 9.

Even in such a flow of processing as in the first modification or the second modification, if a printer performs printing processing as illustrated in FIG. 9, it is possible to visually recognize, from both sides of a medium, a color image that is approximately the same as image data.

Second Embodiment

Figure 15:
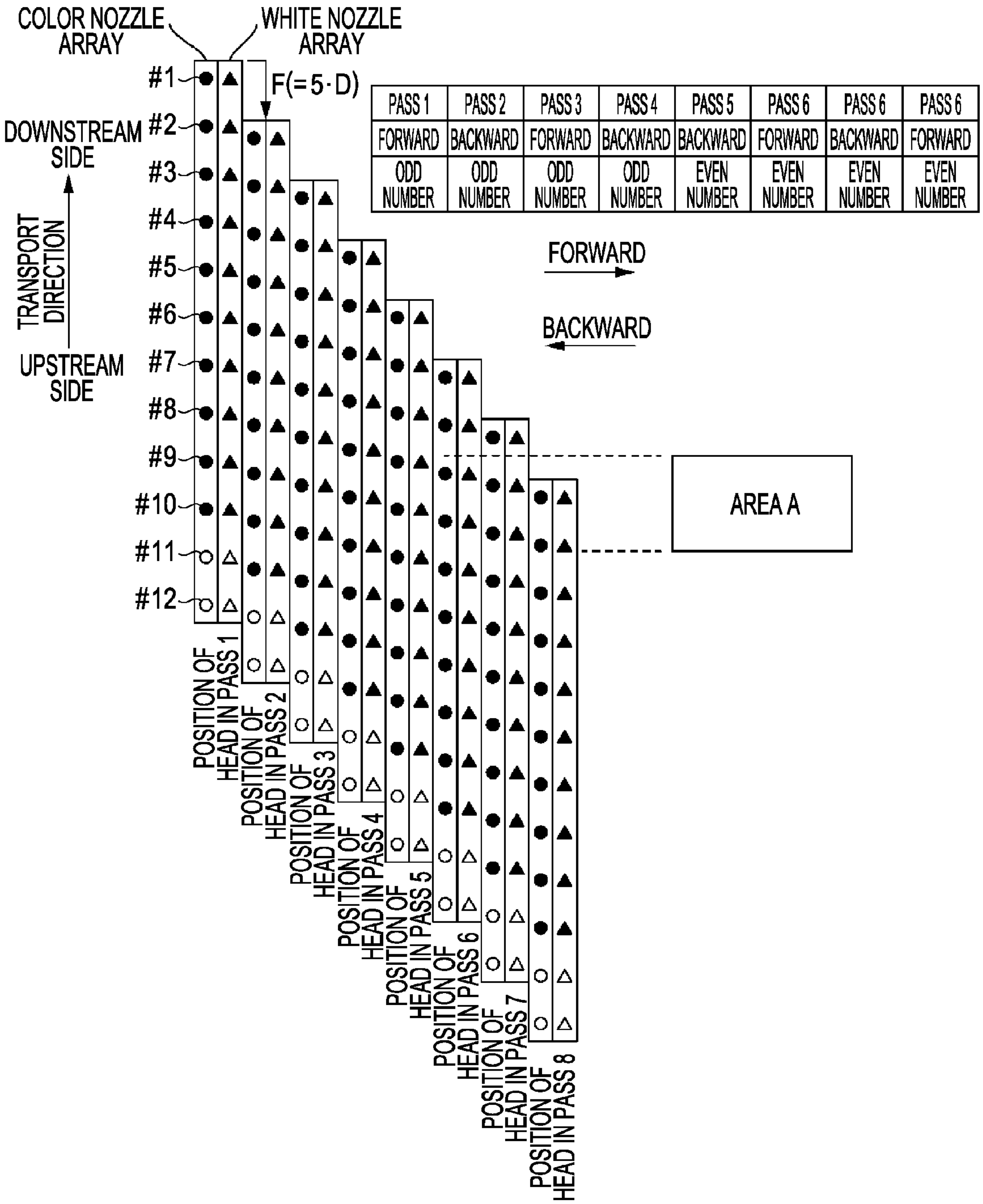
FIG. 15 is an illustration of a printing method of a second embodiment.

FIG. 15 is an illustration of a printing method of a second embodiment. With attention focused on operation of a color nozzle array and operation of a white nozzle array, overlap printing is carried out in either operation. In the second embodiment, like in the first embodiment, the positions in the transport direction of color nozzles (nozzles #1 to #10) discharging color ink overlap the positions in the transport direction of white nozzles (nozzles #1 to #10) discharging white ink. In this embodiment also, bidirectional printing is carried out. As illustrated in FIG. 15, a carriage moves forward in the passes 1, 3, 6, and 8, and moves backward in the passes 2, 4, 5, and 7.

Figure 16A:
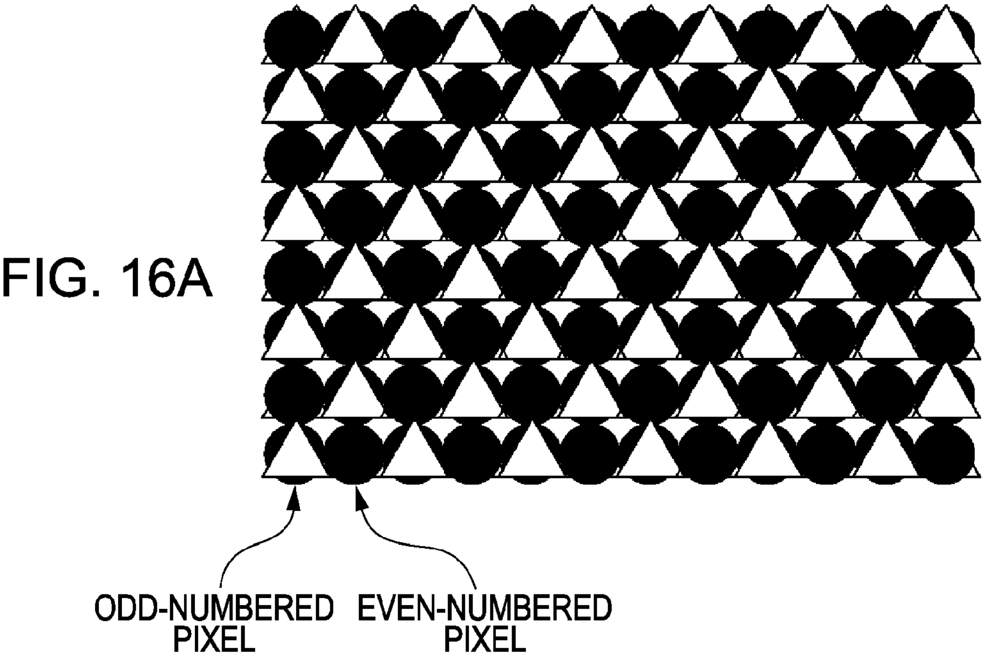
FIG. 16A and FIG. 16B are illustrations of the manner of dots of eight raster lines in an area of FIG. 15.
Figure 16B:
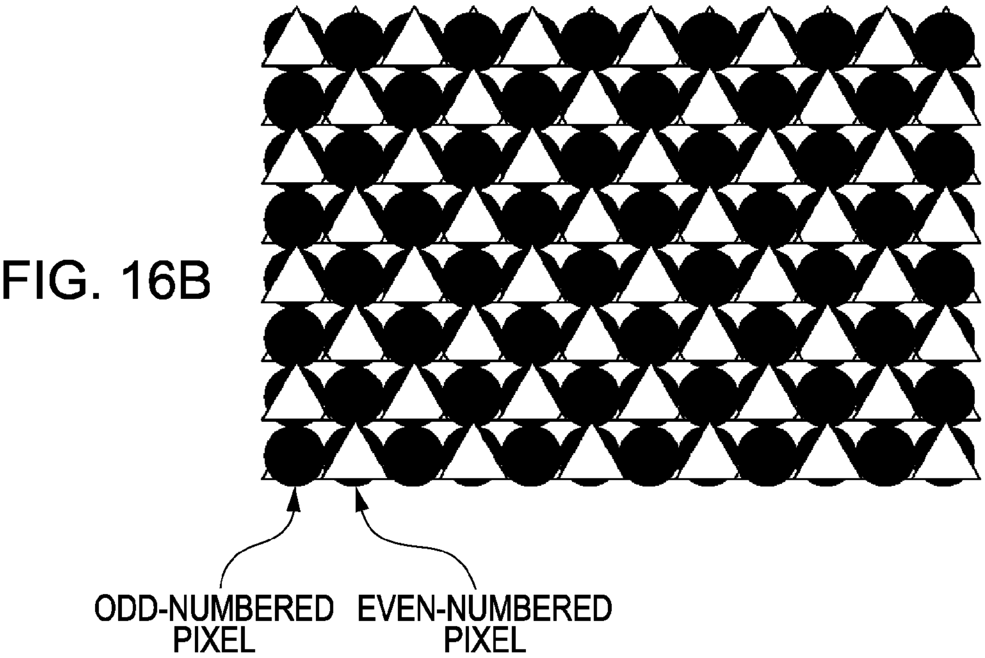

FIG. 16A and FIG. 16B are illustrations of the manner of dots of eight raster lines in the area A of FIG. 15. FIG. 16A is an illustration of the manner of dots viewed from the front side. FIG. 16B is an illustration of the manner of dots viewed from the back side. Here, for the sake of simplicity, a color dot and a white dot are formed in every pixel.

In any raster line in the area A, pixels in which a dot is formed when a carriage moves forward and pixels in which a dot is formed when a carriage moves backward are arranged alternately in the moving direction. In other words, in any raster line in the area A, a color dot and a white dot formed in a pass in which the carriage moves forward are positioned between color dots and white dots formed with spacing therebetween in a pass in which the carriage moves backward. Accordingly, in either raster line, pixels in which a white dot is formed on a color dot and pixels in which a color dot is formed on a white dot are arranged alternately in the moving direction. As a result, in either raster line, pixels in which a color dot is easy to recognize and pixels in which a color dot is hard to recognize, when viewed from either of front and back sides of a medium, are arranged alternately in the moving direction.

In the printing method of the first embodiment, since the raster lines in which color dots are easy to recognize and the raster lines in which color dots are hard to recognize are alternately arranged, there is a possibility that lines along the moving direction might be visually recognized (refer to FIG. 12B). By contrast, in the second embodiment, since the pixels in which color dots are easy to visually recognize and the pixels in which color dots are hard to visually recognize are arranged alternately in the moving direction, lines along the moving direction are less likely to be visually recognized.

Third Embodiment

Figure 17A:
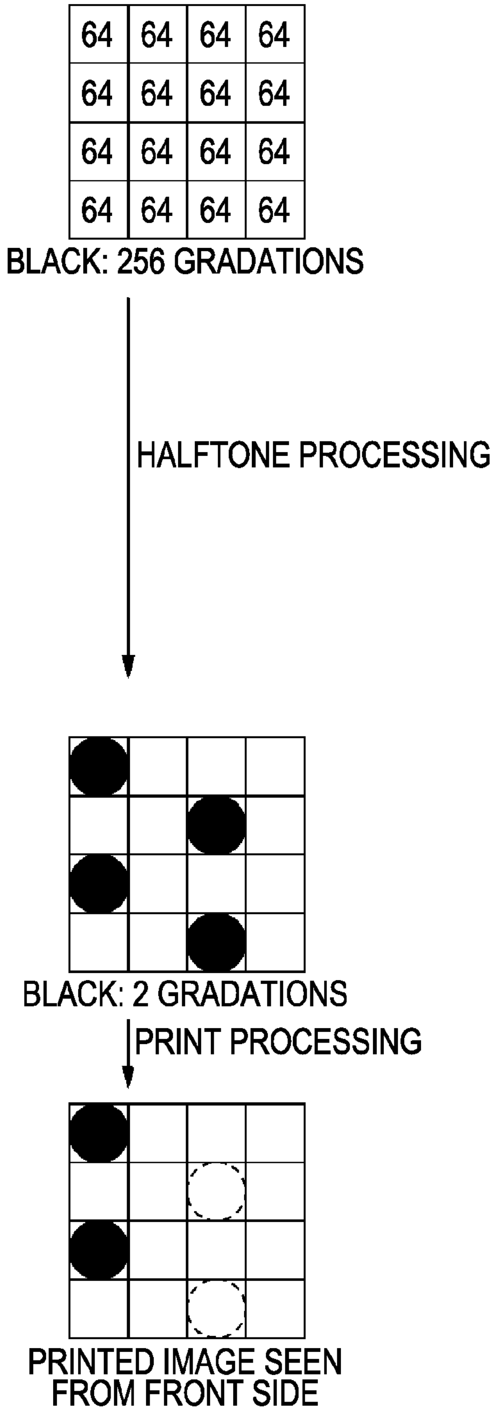
FIG. 17A illustrates processing of the first embodiment or the second embodiment.

FIG. 17A illustrates the processing of the first embodiment and the second embodiment. Here, for the sake of explanation, assume that all of 16 pieces of pixel data after the color conversion processing represent the same gradation value "64". Among data in CMYK color space after the color conversion processing, attention is focused on data of black alone.

As illustrated in FIG. 17A, data of 256 gradations is converted by the halftone processing into data in such a manner as to form dots in four pixels of 16 pixels (the dot generation rate is 25%). In accordance with the data, four dots (color dots) are formed on a medium. With the printing method according to the first embodiment or the second embodiment, half the dots are hard to visually recognize because they are hidden under white dots. For this reason, in the first embodiment and the second embodiment, a color image printed on a medium appears light in contrast with the density of a color image represented by image data.

Figure 17B:
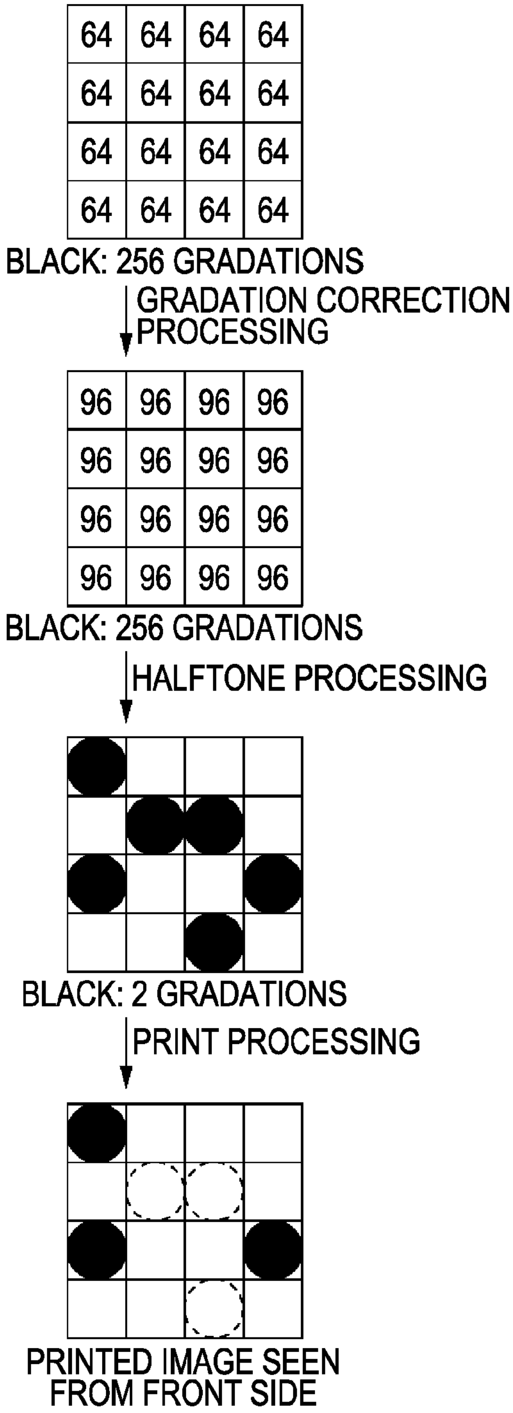
FIG. 17B illustrates the processing of a third embodiment.

FIG. 17B illustrates processing of a third embodiment. According to the third embodiment, gradation correction processing to make dark the pixel data after color conversion processing is performed. Here, the original gradation value "64" is corrected to a deep gradation value "96" by the gradation correction processing. In this way, in the third embodiment, even when converted by the same halftone processing as in the first embodiment and the second embodiment, data of 256 gradations is converted to data in such a manner as to form dots in six pixels (the dot generation rate increases). For this reason, even if the printing method of the first embodiment or the second embodiment is performed in accordance with the data and, as a result, half the color dots are hidden under white dots, a color image printed on a medium is corrected such that the color image is deep compared with that in the first embodiment or the second embodiment.

Note that the color dot indicated by the dotted line in the figure is a color dot hidden under a white dot. Although hidden under the white dot, the color dot is visually recognized as being slightly deep compared with a pixel in which no color dot is formed. To address this, in the gradation correction processing, it is preferable that, in consideration of the density of color dots hidden under white dots, the gradation value be corrected such that the dot generation rate after the halftone processing is less than two times that in the case without the gradation correction processing.

In the case where a color image is a natural image, the pixel data after color conversion processing often represents a halftone gradation value. In such a case, the gradation correction processing of the third embodiment is effective. In cases where a color image is a character (text), however, pixels of an area to be filled often have a gradation value of a maximum density, and therefore the effect of the third embodiment is small.

Others

The foregoing embodiments have been described mainly for the printer. It is to be understood that the disclosure of a printing apparatus, a printing method, a program, a storage medium having the program stored therein, and so on is included in the description.

Also, the foregoing embodiments are intended to facilitate understanding of the invention and are not intended to interpret the invention in a limited manner. It is to be understood that the invention may be modified and improved without departing from the spirit thereof and the invention includes equivalents thereof. In particular, even an embodiment described below is included in the invention.

Nozzle

In the foregoing embodiments, ink is discharged by using a piezoelectric element. However, the method of discharging liquid is not limited to this. For example, other methods, such as a method of generating bubbles in a nozzle by heat, may be used.

Ink

In the foregoing embodiments, UV ink having a property in which the ink is cured when irradiated with UV light has been used. However, UV ink does not necessarily need to be used. If UV ink is not used, the foregoing irradiation unit 60 is also unnecessary.

What is claimed is:

1. A printing apparatus comprising:

a transport unit configured to transport a transparent medium in a transport direction;

a first nozzle array having a plurality of nozzles arranged in the transport direction, the plurality of nozzles being configured to discharge ink for forming a color image to form a color dot on the medium;

a second nozzle array having a plurality of nozzles arranged in the transport direction, the plurality of nozzles being configured to discharge ink for forming a background image to form a background dot on the medium; and a carriage configured to cause the first nozzle array and the second nozzle array to move along a moving direction intersecting the transport direction, wherein the color image and the background image are formed on the medium by repeating a dot formation operation of causing the ink to be discharged from the first nozzle array and the second nozzle array moving in the moving direction to form the color dot and the background dot on the medium and a transport operation of transporting the medium in the transport direction, wherein a pixel in which the background dot is formed directly on top of the color dot that landed on the medium and a pixel in which the color dot is formed directly on top of the background dot that landed on the medium are mixed so as to form an area where the color image and the background image overlap, wherein correction processing of increasing a density of data representing the color image is performed, and the color image is formed on the medium in accordance with the data after the correction processing, and wherein a generation rate of the color dot constituting the color image in a case where the correction processing has been performed is less than two times a generation rate in a case where the correction processing is not performed.

2. The printing apparatus according to claim 1, wherein by causing, during the dot formation operation, positions in the transport direction of the nozzles discharging the ink of the first nozzle array to overlap positions in the transport direction of the nozzles discharging the ink of the second nozzle array, and by repeatedly performing the dot formation operation in which the first nozzle array and the second nozzle array move forward in the moving direction and the dot formation operation in which the first nozzle array and the second nozzle array move backward in the moving direction, the pixel in which the background dot is formed on the color dot and the pixel in which the color dot is formed on the background dot are mixed in the area where the color image and the background image overlap.

3. The printing apparatus according to claim 1, wherein the plurality of nozzles of the first nozzle array and the plurality of nozzles of the second nozzle array are arranged, in each nozzle array, at a predetermined interval along the transport direction, by repeating the dot formation operation and the transport operation, a plurality of dot rows are formed along the transport direction at an interval shorter than the predetermined interval, and of the dot rows, first ones in which the background dot is formed on the color dot and second ones in which the color dot is formed on the background dot are alternately formed in the area where the color image and the background image overlap.

4. The printing apparatus according to claim 1, wherein between the color dot and the background dot formed so as to be spaced in the dot formation operation in which the first nozzle array and the second nozzle array move outward in the moving direction, the color dot and the background dot formed in the dot formation operation in which the first nozzle array and the second nozzle array move backward in the moving direction are positioned.

5. A printing method using a printing apparatus including a transport unit configured to transport a transparent medium in a transport direction, a first nozzle array having a plurality of nozzles arranged in the transport direction, the plurality of nozzles being configured to discharge ink for forming a color image to form a color dot on the medium, a second nozzle array having a plurality of nozzles arranged in the transport direction, the plurality of nozzles being configured to discharge ink for forming a background image to form a background dot on the medium, and a carriage configured to cause the first nozzle array and the second nozzle array to move along a moving direction intersecting the transport direction, the printing method comprising forming the color image and the background image on the medium by repeating a dot formation operation of causing the ink to be discharged from the first nozzle array and the second nozzle array moving in the moving direction to form the color dot and the background dot on the medium and a transport operation of transporting the medium in the transport direction, wherein a pixel in which the background dot is formed directly on top of the color dot that landed on the medium and a pixel in which the color dot is formed directly on top of the background dot that landed on the medium are mixed so as to form an area where the color image and the background image overlap, wherein correction processing of increasing a density of data representing the color image is performed, and the color image is formed on the medium in accordance with the data after the correction processing, wherein a generation rate of the color dot constituting the color image in a case where the correction processing has been performed is less than two times a generation rate in a case where the correction processing is not performed, and wherein the above step is executed by processor.

* * * * *